US011877277B2

(12) United States Patent
Kusashima et al.

(10) Patent No.: US 11,877,277 B2
(45) Date of Patent: Jan. 16, 2024

(54) TERMINAL DEVICE, BASE STATION DEVICE AND METHOD

(71) Applicant: SONY CORPORATION, Tokyo (JP)

(72) Inventors: Naoki Kusashima, Kanagawa (JP); Kazuyuki Shimezawa, Kanagawa (JP); Hiromasa Uchiyama, Tokyo (JP); Ryota Kimura, Tokyo (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1219 days.

(21) Appl. No.: 16/339,267

(22) PCT Filed: Oct. 3, 2017

(86) PCT No.: PCT/JP2017/035940
§ 371 (c)(1),
(2) Date: Apr. 3, 2019

(87) PCT Pub. No.: WO2018/083929
PCT Pub. Date: May 11, 2018

(65) Prior Publication Data
US 2019/0254050 A1    Aug. 15, 2019

(30) Foreign Application Priority Data
Nov. 2, 2016    (JP) .................. 2016-215192

(51) Int. Cl.
*H04W 72/1263*    (2023.01)
*H04W 24/10*    (2009.01)
(Continued)

(52) U.S. Cl.
CPC ....... *H04W 72/1263* (2013.01); *H04W 24/00* (2013.01); *H04W 24/10* (2013.01);
(Continued)

(58) Field of Classification Search
CPC . H04W 72/1263; H04W 24/00; H04W 24/10; H04W 72/04; H04W 72/12;
(Continued)

(56) References Cited

U.S. PATENT DOCUMENTS 10,212,637 B2 * 2/2019 Jung ............... H04W 36/04
2007/0253372 A1 11/2007 Nakayasu
(Continued)

FOREIGN PATENT DOCUMENTS

CN    101064962 A    10/2007
CN    101361298 A    2/2009
(Continued)

OTHER PUBLICATIONS

NTT Docomo "Discussion on initial access and mobility for NR", Aug. 22-26, 2016 (Year: 2016).*
(Continued)

*Primary Examiner* — Derrick W Ferris
*Assistant Examiner* — Chuong M Nguyen
(74) *Attorney, Agent, or Firm* — CHIP LAW GROUP

(57) ABSTRACT

Provided is a terminal device including a measuring unit that performs downlink measurement on the basis of a downlink reference signal, and a transmitting unit that transmits a first uplink reference signal on the basis of first setting related to measurement for radio resource management. The transmitting unit transmits the first uplink reference signal in a case in which a first condition is satisfied, and the measuring unit performs the downlink measurement in a case in which a second condition is satisfied.

11 Claims, 24 Drawing Sheets

(51) Int. Cl.
　　H04W 88/02　　(2009.01)
　　H04W 76/28　　(2018.01)
　　H04W 72/04　　(2023.01)
　　H04W 72/12　　(2023.01)
　　H04W 24/00　　(2009.01)
　　H04W 92/20　　(2009.01)
　　H04W 88/08　　(2009.01)

(52) U.S. Cl.
　　CPC ........... *H04W 72/04* (2013.01); *H04W 72/12* (2013.01); *H04W 76/28* (2018.02); *H04W 88/02* (2013.01); *H04W 92/20* (2013.01); *H04W 88/08* (2013.01)

(58) Field of Classification Search
　　CPC ..... H04W 76/28; H04W 88/02; H04W 92/20; H04W 88/08; H04W 72/0453; H04L 5/0048
　　See application file for complete search history.

(56) References Cited

U.S. PATENT DOCUMENTS

| | | | |
|---|---|---|---|
| 2009/0180414 | A1 | 7/2009 | Maeda et al. |
| 2010/0048209 | A1* | 2/2010 | Aoyama ............... H04W 24/10 455/435.2 |
| 2012/0170485 | A1* | 7/2012 | Maeda ................ H04W 52/028 370/252 |
| 2012/0250558 | A1* | 10/2012 | Chung .................. H04L 1/0027 370/252 |
| 2013/0288682 | A1* | 10/2013 | Wang .................... H04W 36/22 455/436 |
| 2013/0343252 | A1* | 12/2013 | Chakraborty ..... H04W 52/0261 370/311 |
| 2014/0200016 | A1 | 7/2014 | Siomina et al. |
| 2014/0313908 | A1* | 10/2014 | da Silva .................. H04W 4/70 370/252 |
| 2015/0222402 | A1* | 8/2015 | Ouchi .................... H04W 72/21 370/329 |
| 2016/0366640 | A1 | 12/2016 | Maeda et al. |
| 2016/0373994 | A1* | 12/2016 | Yiu .................. H04W 52/0206 |
| 2017/0331670 | A1* | 11/2017 | Parkvall ................ H04W 24/10 |

FOREIGN PATENT DOCUMENTS

| | | |
|---|---|---|
| CN | 102858002 A | 1/2013 |
| CN | 104685948 A | 6/2015 |
| CN | 105050173 A | 11/2015 |
| CN | 105050174 A | 11/2015 |
| CN | 105474668 A | 4/2016 |
| EP | 1855502 A1 | 11/2007 |
| EP | 2031775 A1 | 3/2009 |
| EP | 2903374 A1 | 8/2015 |
| EP | 2987342 A2 | 2/2016 |
| JP | 2007-295318 A | 11/2007 |
| JP | 2012-023625 A | 2/2012 |
| JP | 2012-023770 A | 2/2012 |
| JP | 2013-219808 A | 10/2013 |
| JP | 2014-239502 A | 12/2014 |
| JP | 2016-001929 A | 1/2016 |
| JP | 6205648 B2 | 10/2017 |
| WO | 2007/144956 A1 | 12/2007 |
| WO | 2007/145006 A1 | 12/2007 |
| WO | 2007/145035 A1 | 12/2007 |
| WO | 2012/022199 A1 | 2/2012 |
| WO | 2014/050584 A1 | 4/2014 |
| WO | 2014/170851 A2 | 10/2014 |

OTHER PUBLICATIONS

"3rd Generation Partnership Project; Technical Specification Group Radio Access Network; Study on Scenarios and Requirements for Next Generation Access Technologies", 3GPP TR 38.913 V0.3.0, Mar. 2016, 30 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V14.0.0, Sep. 2016, 314 pages.

International Search Report and Written Opinion of PCT Application No. PCT/JP2017/035940, dated Dec. 19, 2017, 09 pages of ISRWO.

Extended European Search Report of EP Application No. 17867647.4, dated Jul. 8, 2019, 13 pages.

"Discussion on initial access and mobility for NR", NTT Docomo, Inc., 3GPP TSG RAN WG1, 86th Meeting, Gothenburg, Sweden, Aug. 22-26, 2016, 10 pages.

"General views on reference signal design", CCMC, 3GPP TSG RAN WG1, 85th Meeting, Nanjing, China, May 23-27, 2016, 04 pages.

Office Action for IN Patent Application No. 201917016456, dated Sep. 21, 2021, 06 pages of Office Action.

"3rd Generation Partnership Project; Technical Specification Group Radio Access Network; Evolved Universal Terrestrial Radio Access (E-UTRA) and Evolved Universal Terrestrial Radio Access Network (E-Utran)", 3GPP TS 36.300 V14.0.0, Sep. 2016, 314 Pages.

"3rd Generation Partnership Project; Technical Specification Group Radio Access Network; Study on Scenarios and Requirements for Next Generation Access Technologies", 3GPP TR 38.913 V0.3.0, Mar. 2013, 30 pages.

Office Action for TW Patent Application No. 20170136294, dated Jan. 21, 2021.

"General views on reference signal design", CMCC, 3GPP TSG RAN WG1 85th Meeting, Nanjing, China, R1-164892, May 23-27, 2016, 04 pages.

"Discussion on initial access and mobility for NR", NTT Docomo, Inc, 3GPP TSG RAN WG1 86th Meeting Gothenburg, Sweden, R1-167912, Aug. 22-26, 2016, 10 pages.

"RRM Measurement for NR", Huawei, HiSilicon, 3GPP TSG RAN WG1 86th Meeting Gothenburg, Sweden, R1-167200, Aug. 22-26, 2016, 04 pages.

\* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20 MHz | TYPE 1 | 14 | 1 ms | 10 ms | 12 |
| PARAMETER SET 1 | 7.5 kHz | 1.4 MHz | TYPE 1 | 70 | 10 ms | 10 ms | 24 |
| PARAMETER SET 2 | 30 kHz | 80 MHz | TYPE 1 | 7 | 0.25 ms | 10 ms | 6 |
| PARAMETER SET 3 | 15 kHz | 20 MHz | TYPE 2 | 12 | 1 ms | 10 ms | 12 |
| ... | ... | ... | ... | ... | ... | ... | ... |

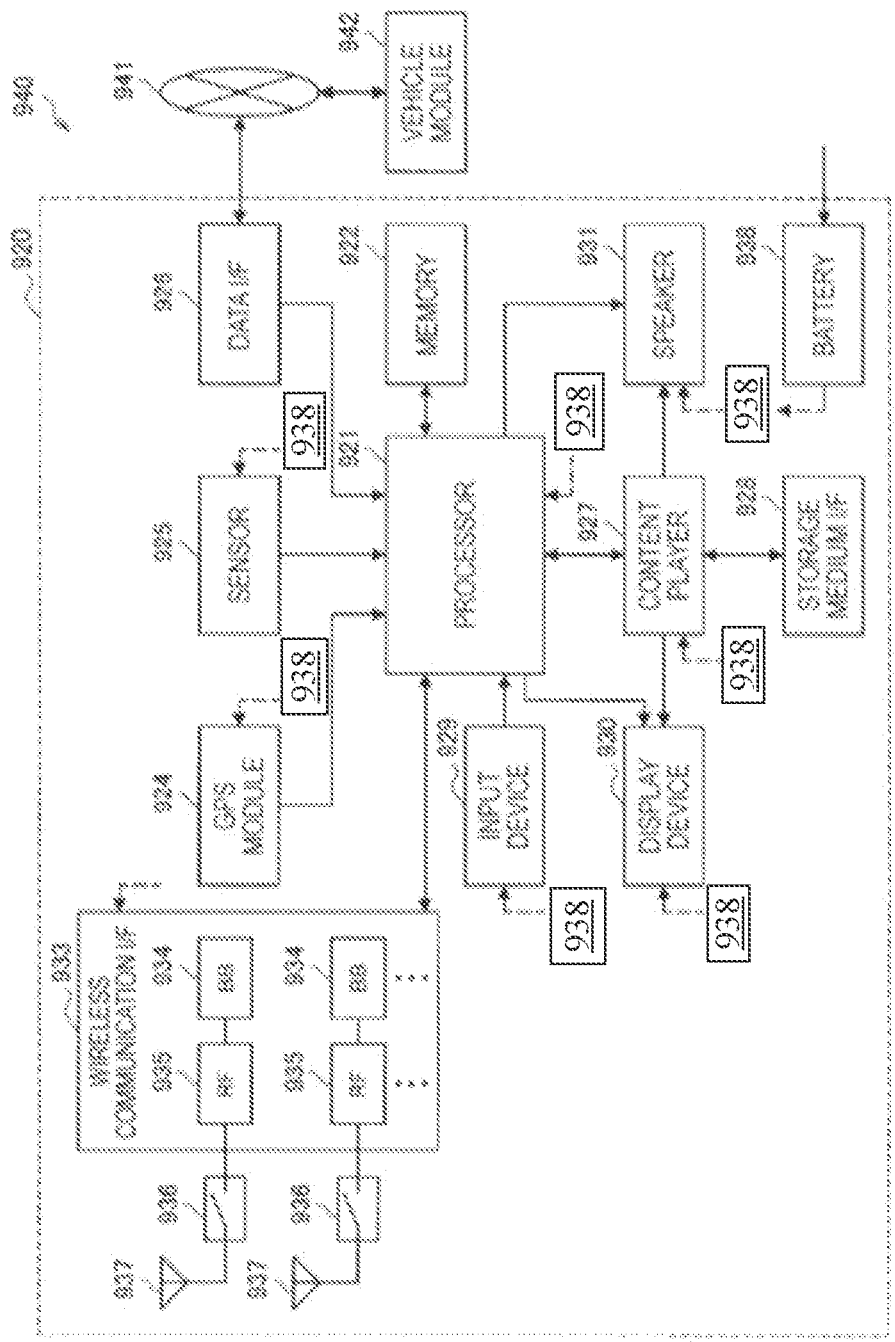

TERMINAL DEVICE, BASE STATION DEVICE AND METHOD

CROSS REFERENCE TO RELATED APPLICATIONS

This application is a U.S. National Phase of International Patent Application No. PCT/JP2017/035940 filed on Oct. 3, 2017, which claims priority benefit of Japanese Patent Application No. JP 2016-215192 filed in the Japan Patent Office on Nov. 2, 2016. Each of the above-referenced applications is hereby incorporated herein by reference in its entirety.

TECHNICAL FIELD

The present disclosure relates to a terminal device, a base station device, and a method.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

In addition, Non-Patent Literature 2 discloses the details of a reference signal for measuring transmitted and received between a terminal device and a base station device to manage radio resources.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0. 3.0 (2016-03) <http://www.3gpp.org/ftp/Specs/archive/38_series/38.913/38913-030.zip>

Non-Patent Literature 2: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 3GPP TR 36.300 V14.0.0 (2016-09) <http://www.3gpp.org/ftp/Specs/archive/36_series/36.300/36300-e00.zip>

DISCLOSURE OF INVENTION

Technical Problem

In recent years, measurement for radio resource management is considered to be preferably performed on the basis of uplink reference signals. Accordingly, in wireless access technologies, in order to perform more efficiently radio resource management, it is preferable to support both measurement of a downlink reference signal for radio resource management and measurement of an uplink reference signal for radio resource management. In addition, from the viewpoint of communication overhead, it is preferable to appropriately control radio resources or the like used in measurement for management of the radio resources depending on communication situations.

Accordingly, the present disclosure provides a structure capable of improving transmission efficiency of an entire system by appropriately using measurement of an uplink reference signal for radio resource management.

Solution to Problem

According to the present disclosure, there is provided a terminal device including: a measuring unit configured to perform downlink measurement on the basis of a downlink reference signal; and a transmitting unit configured to transmit a first uplink reference signal on the basis of first setting related to measurement for radio resource management. The transmitting unit transmits the first uplink reference signal in a case in which a first condition is satisfied, and the measuring unit performs the downlink measurement in a case in which a second condition is satisfied.

Moreover, according to the present disclosure, there is provided a base station device including: a transmitting unit configured to transmit a downlink reference signal; and a measuring unit configured to perform first uplink measurement on the basis of a first uplink reference signal transmitted by a terminal device that transmits the first uplink reference signal on the basis of first setting related to measurement for radio resource management in a case in which a first condition is satisfied, and performs downlink measurement on the basis of the downlink reference signal in a case in which a second condition is satisfied.

Moreover, according to the present disclosure, there is provided a method performed by a processor, the method including: performing downlink measurement on the basis of a downlink reference signal in a case in which a second condition is satisfied; and transmitting a first uplink reference signal on the basis of first setting related to measurement for radio resource management in a case in which a first condition is satisfied.

Moreover, according to the present disclosure, there is provided a method performed by a processor, the method including: transmitting a downlink reference signal; and performing first uplink measurement on the basis of a first uplink reference signal transmitted by a terminal device that transmits the first uplink reference signal on the basis of first setting related to measurement for radio resource management in a case in which a first condition is satisfied, and performs downlink measurement on the basis of the downlink reference signal in a case in which a second condition is satisfied.

Advantageous Effects of Invention

According to the present disclosure, as described above, it is possible to provide a structure capable of improving transmission efficiency of an entire system by appropriately using measurement of an uplink reference signal for radio resource management. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

FIG. 25 is a block diagram illustrating an example of a schematic configuration of a car navigation apparatus.

MODE(S) FOR CARRYING OUT THE INVENTION

Figure 1:
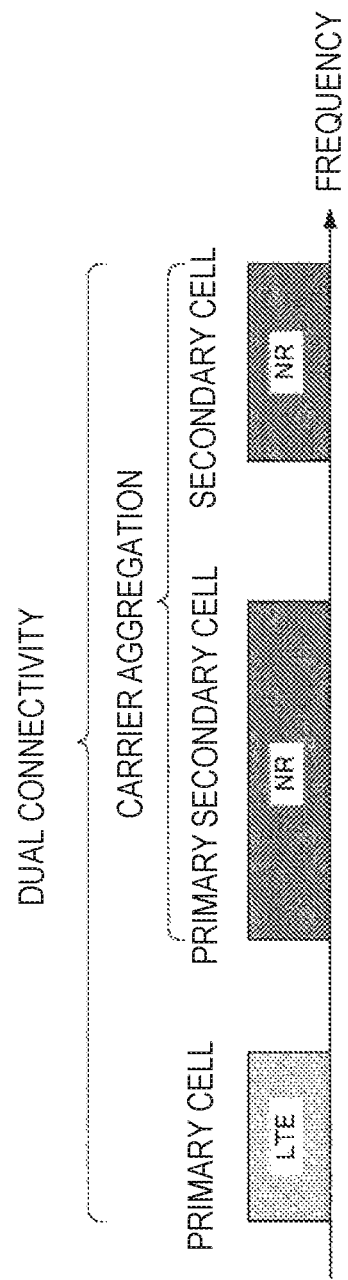
FIG. 1 is a diagram illustrating an example of setting of a component carrier according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.

Further, in the present specification and the drawings, different letters are suffixed to the same reference numerals to distinguish elements which have substantially the same functional configuration. For example, a plurality of elements which have substantially the same functional configuration are distinguished such as base station devices 1A, 1B, and 1C, as necessary. Here, in a case in which it is not necessary to particularly distinguish a plurality of elements which have substantially the same functional configuration, only the same reference numeral is given. For example, in a case in which it is not necessary to particularly distinguish base station devices 1A, 1B, and 1C, the base station devices 1A, 1B, and 1C are simply referred to as the base station devices 1.

Note that the description will be made in the following order.
1. Introduction
2. Technical Features
2.1. Entire Configuration
2.2. Measurement
3. Application Examples
4. Conclusion 1. Introduction First, a technology according to a present embodiment of the present disclosure will be described.
<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells or communication by a set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
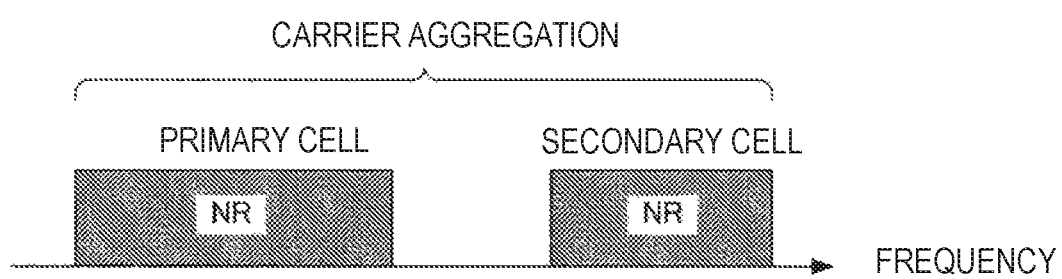
FIG. 2 is a diagram illustrating an example of setting of a component carrier according to the present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in time division duplex (TDD) and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to frequency division duplex (FDD). The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
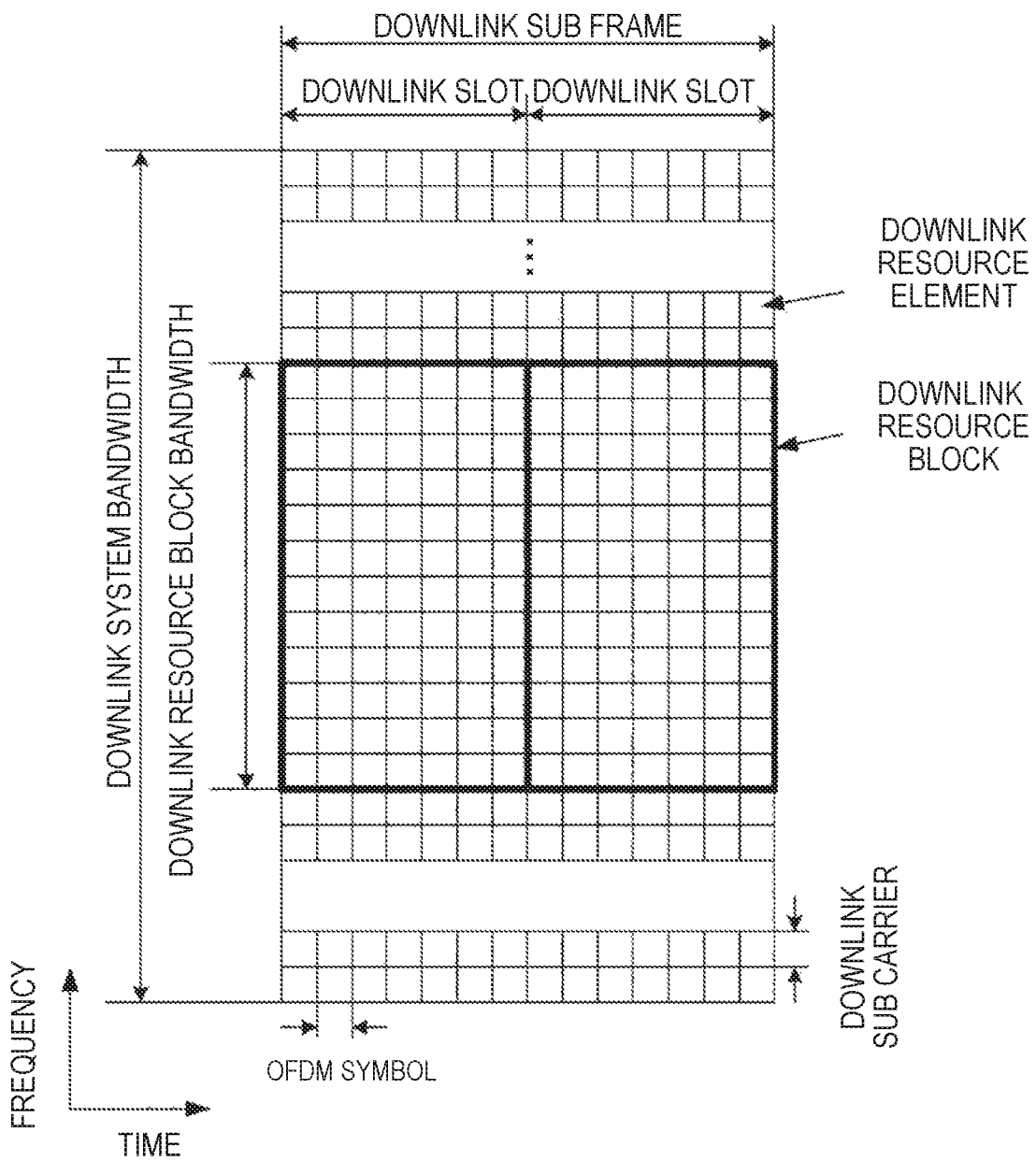
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
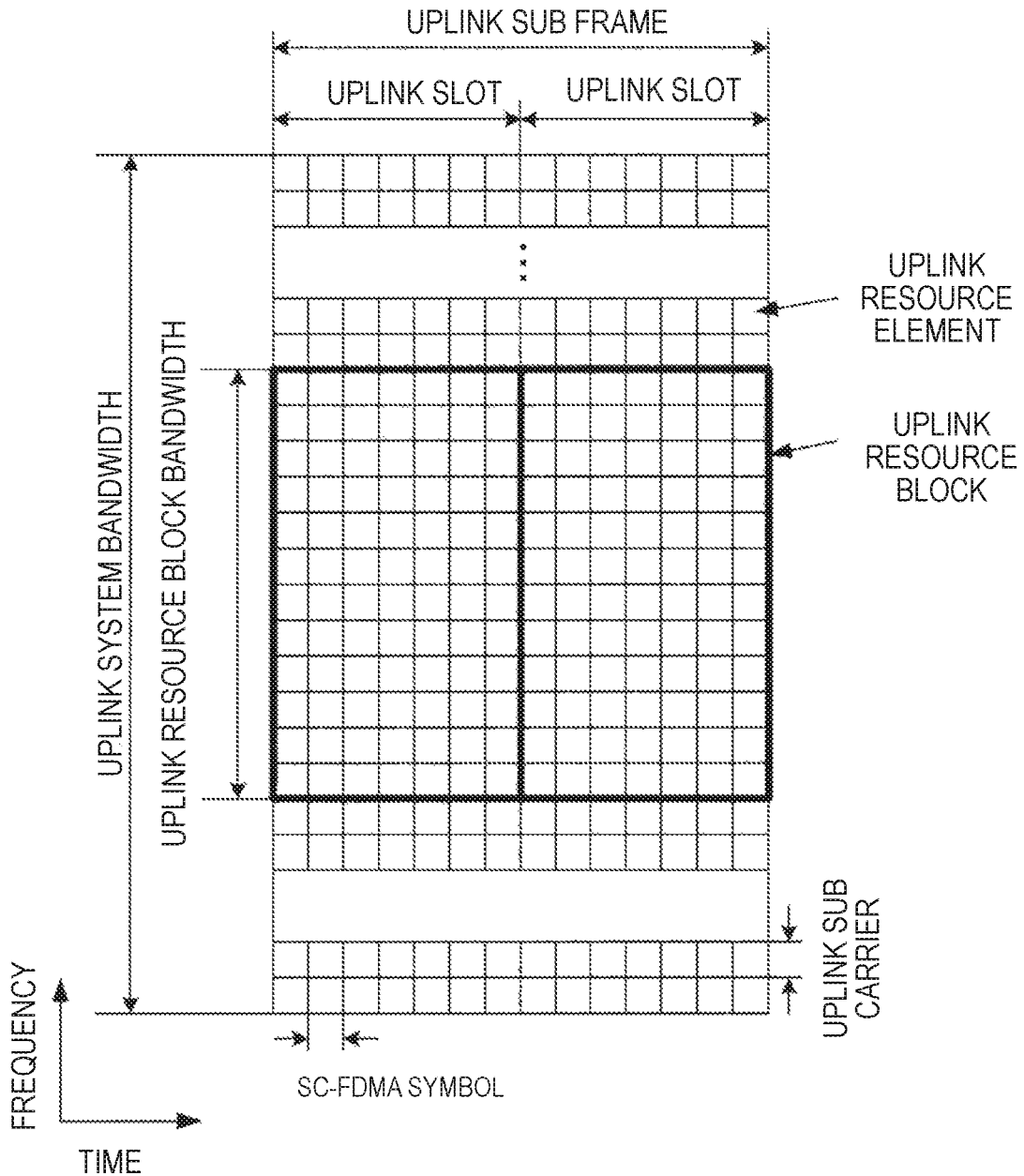
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of subcarriers in a frequency direction and a plurality of OFDM symbols in a time direction. In the uplink, the resource grid is defined by a plurality of subcarriers in the frequency direction and a plurality of SC-FDMA symbols in the time direction. The number of subcarriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a subcarrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive subcarriers in the frequency domain. The number of symbols and the number of subcarriers in one physical resource block are decided on the basis of a parameter set in accordance with a type of CP, a subcarrier interval, and/or a higher layer in the cell. For example, in a case in which the type of CP is the normal CP, and the subcarrier interval is 15 kHz, the number of symbols in one physical resource block is 7, and the number of subcarriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a subcarrier interval, the number of symbols in one sub frame (predetermined time length), the number of subcarriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters is used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a subcarrier interval, the number of subcarriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
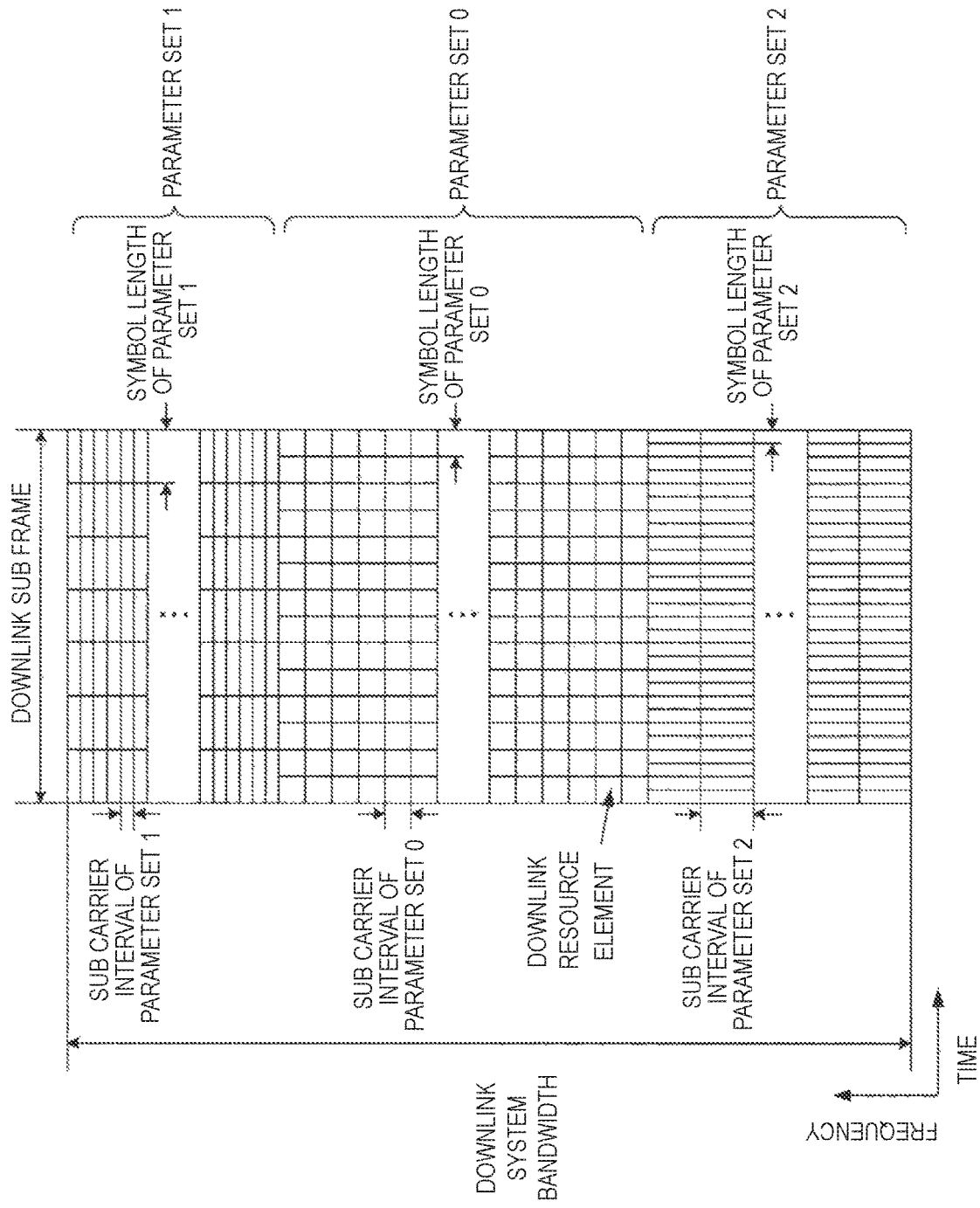
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
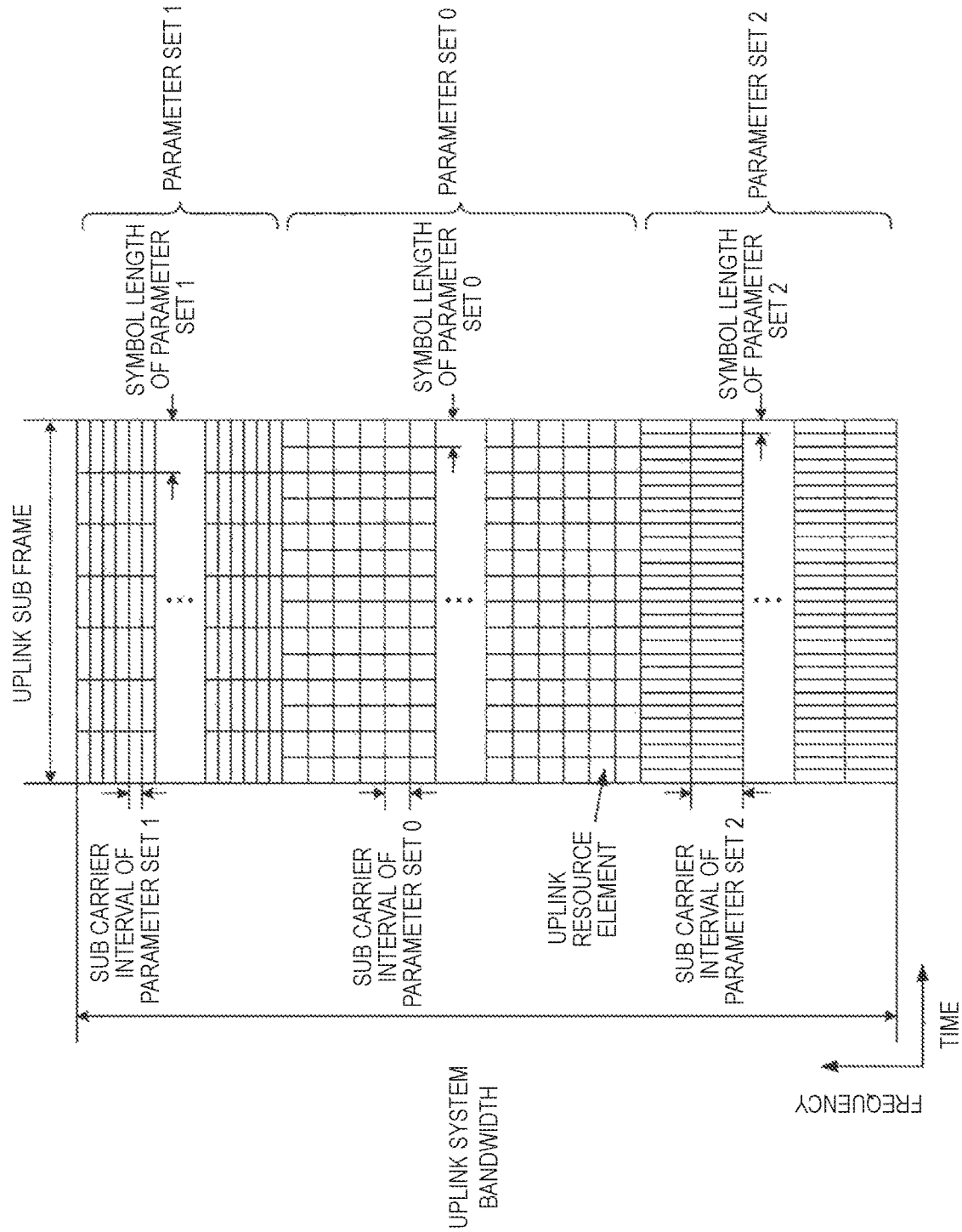
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<NR Physical Channel and NR Physical Signal in Present Embodiment>

In LTE, the description of the physical channel and the physical signal can also be applied to the NR physical channel and the NR physical signal, respectively. The NR physical channel and the NR physical signal are referred to as the following.

The NR downlink physical channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR downlink physical signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR uplink physical channel includes an NR-PUSCH, an NR-PUCCH, an NR-PRACH, and the like.

The NR uplink physical signal includes an NR-UL-RS. The NR-UL-RS includes an NR-UL-DMRS, an NR-SRS, and the like.

The NR sidelink physical channel includes an NR-PSBCH, an NR-PSCCH, an NR-PSDCH, an NR-PSSCH, and the like.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Uplink Physical Signal in Present Embodiment>

The UL-DMRS is associated with transmission of the PUSCH or the PUCCH. The UL-DMRS is time-multiplexed with the PUSCH or the PUCCH. The base station device 1 may use the UL-DMRS to perform the propagation path correction of the PUSCH or the PUCCH. In the description of the present embodiment, the transmission of the PUSCH also includes multiplexing and transmitting the PUSCH and UL-DMRS. In the description of the present embodiment, the transmission of the PUCCH also includes multiplexing and transmitting the PUCCH and the UL-DMRS.

The SRS is not associated with the transmission of the PUSCH or the PUCCH. The base station device 1 may use the SRS to measure the uplink channel state.

The SRS is transmitted using the last symbol in the uplink sub frame. In other words, the SRS is placed in the last symbol in the uplink sub frame. The terminal device 2 can restrict simultaneous transmission of the SRS, the PUCCH, the PUSCH, and/or the PRACH in a certain symbol of a certain cell. The terminal device 2 can transmit the PUSCH and/or the PUCCH using the symbol excluding the last symbol in a certain uplink sub frame of a certain cell in the uplink sub frame and transmit the SRS using the last symbol in the uplink sub frame. In other words, the terminal device 2 can transmit the SRS, the PUSCH, and the PUCCH in a certain uplink sub frame of a certain cell.

In the SRS, a trigger type 0 SRS and a trigger type 1 SRS are defined as SRSs having different trigger types. The trigger type 0 SRS is transmitted in a case in which a parameter related to the trigger type 0 SRS is set by signaling of a higher layer. The trigger type 1 SRS is transmitted in a case in which a parameter related to the trigger type 1 SRS is set by signaling of the higher layer, and transmission is requested by an SRS request included in the DCI format 0, 1A, 2B, 2C, 2D, or 4. Further, the SRS request is included in both FDD and TDD for the DCI format 0, 1A, or 4 and included only in TDD for the DCI format 2B, 2C, or 2D. In a case in which the transmission of the trigger type 0 SRS and the transmission of the trigger type 1 SRS occur in the same sub frame of the same serving cell, a priority is given to the transmission of the trigger type 1 SRS. The trigger type 0 SRS is referred to as a periodic SRS. The trigger type 1 SRS is referred to as an aperiodic SRS.

<Configuration Example of Base Station Device 1 in Present Embodiment>

Figure 8:
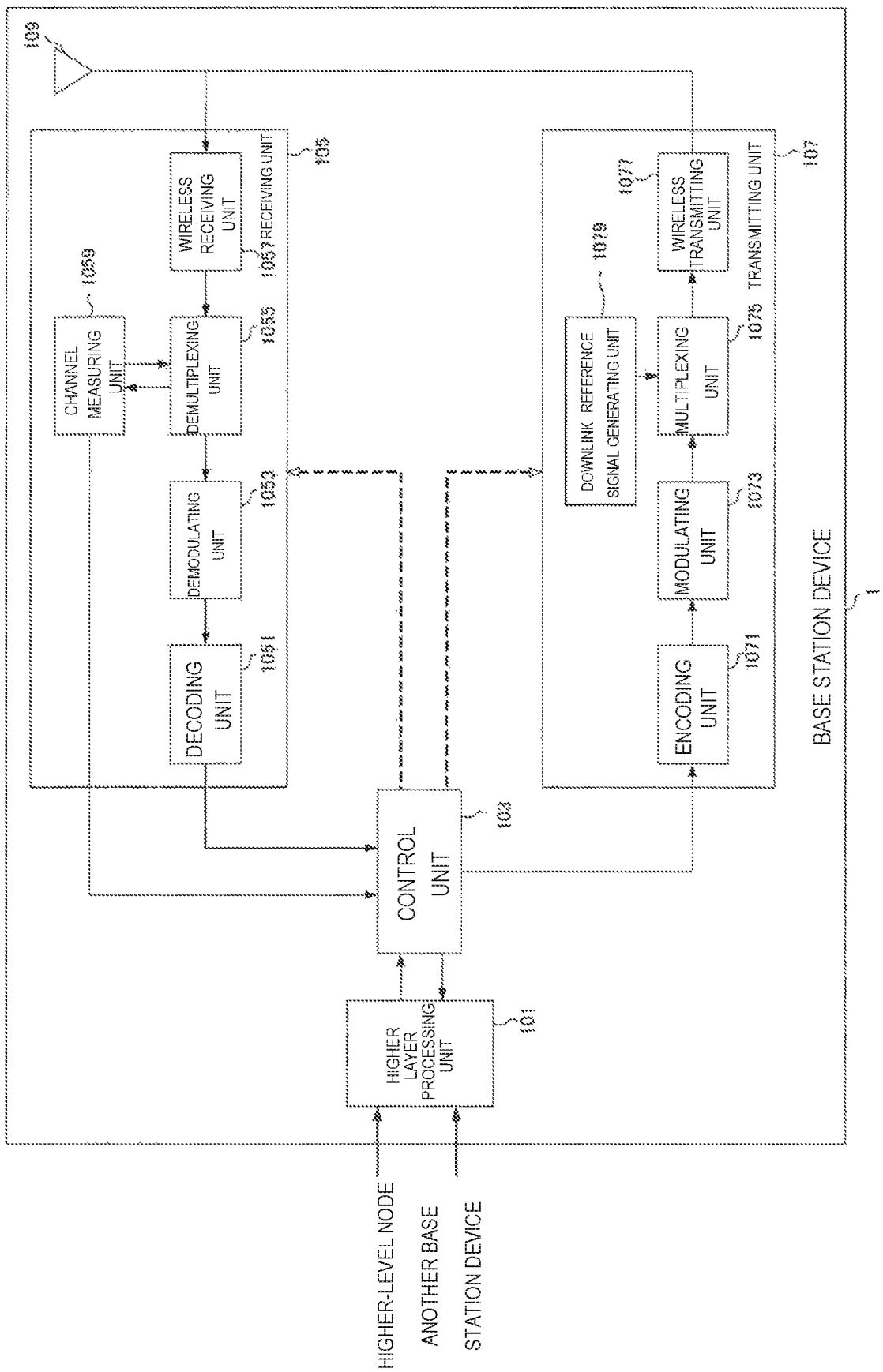
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 8, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Terminal Device 2 in Present Embodiment>

Figure 9:
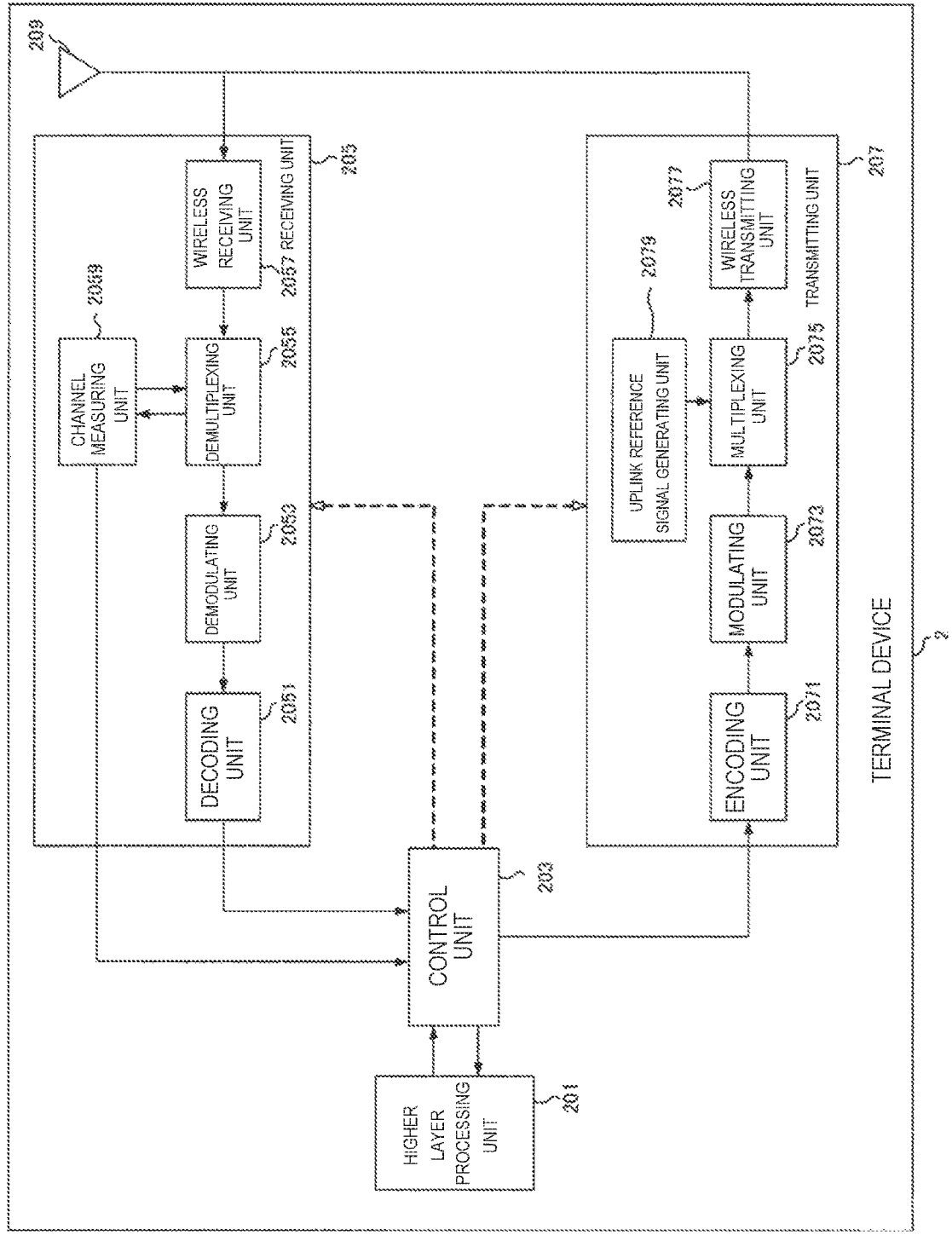
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 9, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N−1. For example, in a case in which the number of EREGs used in one ECCE is 4, the EPDCCH set constituted by 4 RB pairs constitutes 16 ECCEs.

<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs are not set between cells in the CG.

In the PCell or the PSCell, semi-persistent scheduling (SPS) or discontinuous reception (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Terminal State in Present Embodiment>

In the terminal device, terminal states (terminal modes) are defined.

As one of the terminal states, an idle state (an idle mode) is defined. The idle state is a state in which connection of a terminal device to any base station device is not established.

As one of the terminal states, a connected state (a connected mode) is defined. The connected state is a state in which the connection of the terminal device to one base station device is established.

<Details of Mobility State in Present Embodiment>

In the terminal device, mobility states are defined.

As one of the mobility states, a high-mobility state is defined. In a case in which the number of cell reselections by a terminal device for a predetermined period exceeds a threshold decided as the high-mobility state, the terminal device enters the high-mobility state.

As one of the mobility states, a medium-mobility state is defined. In a case in which the number of cell reselections by a terminal device for a predetermined period exceeds a threshold decided as the medium-mobility state and does not exceed the threshold decided as the high-mobility state, the terminal device enters the high-mobility state. Note that the threshold decided as the medium-mobility state is less than the threshold decided as the medium-mobility state.

As one of the mobility states, a normal-mobility state is defined. In a case in which the number of cell reselections by a terminal device for a predetermined period does not exceed the threshold decided as the medium-mobility state, the terminal device enters the medium-mobility state.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<Details of LTE Downlink Resource Element Mapping in Present Embodiment>

Figure 10:
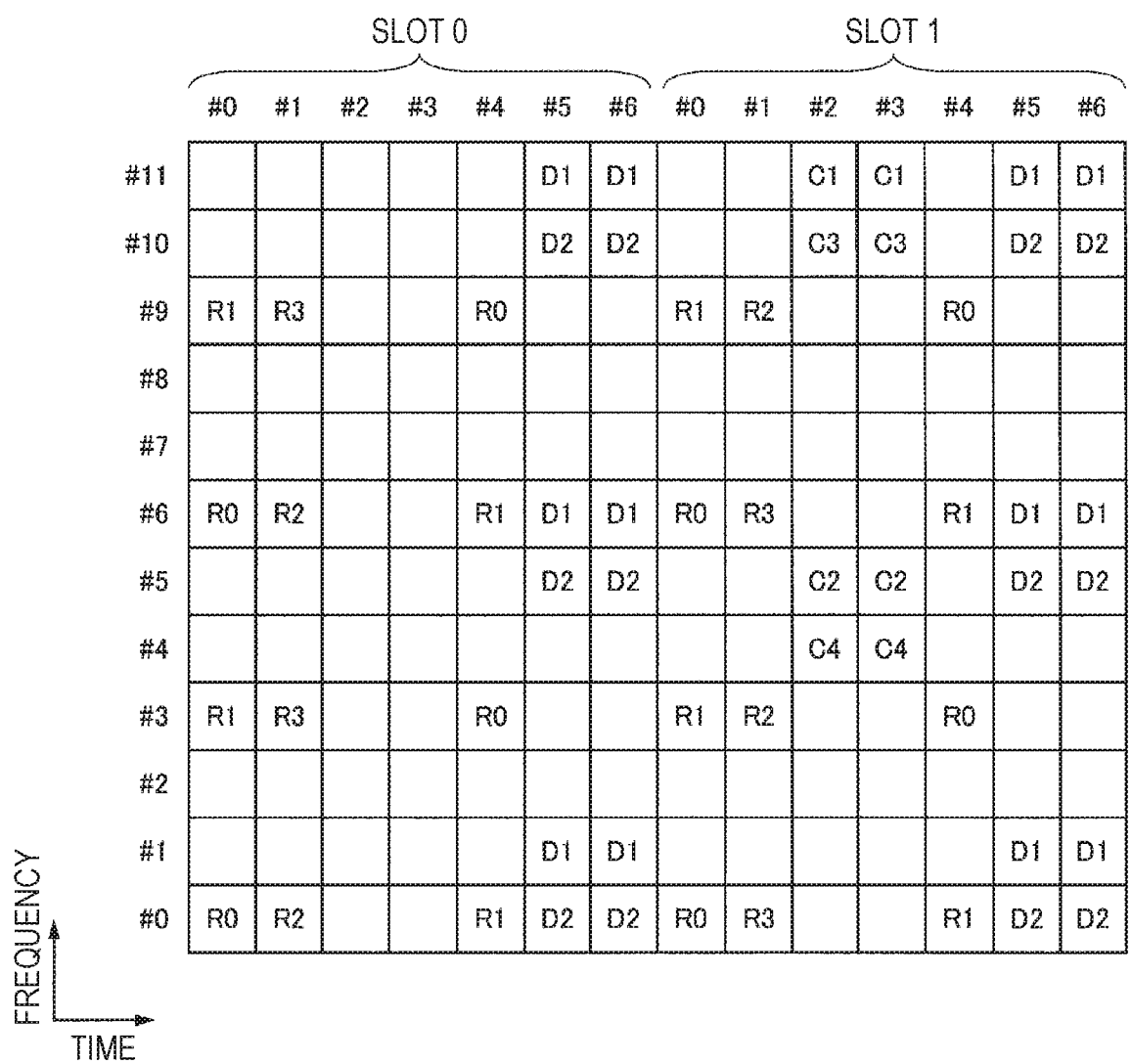
FIG. 10 is a diagram illustrating an example of downlink resource element mapping of LTE of the present embodiment.

FIG. 10 is a diagram illustrating an example of LTE downlink resource element mapping in the present embodiment. In this example, a set of resource elements in one resource block pair in a case in which one resource block and the number of OFDM symbols in one slot are 7 will be described. Further, seven OFDM symbols in a first half in the time direction in the resource block pair are also referred to as a slot 0 (a first slot). Seven OFDM symbols in a second half in the time direction in the resource block pair are also referred to as a slot 1 (a second slot). Further, the OFDM symbols in each slot (resource block) are indicated by OFDM symbol number 0 to 6. Further, the sub carriers in the frequency direction in the resource block pair are indicated by sub carrier numbers 0 to 11. Further, in a case in which a system bandwidth is constituted by a plurality of resource blocks, a different sub carrier number is allocated over the system bandwidth. For example, in a case in which the system bandwidth is constituted by six resource blocks, the sub carriers to which the sub carrier numbers 0 to 71 are allocated are used. Further, in the description of the present embodiment, a resource element (k, 1) is a resource element indicated by a sub carrier number k and an OFDM symbol number 1.

Resource elements indicated by R 0 to R 3 indicate cell-specific reference signals of the antenna ports 0 to 3, respectively. Hereinafter, the cell-specific reference signals of the antenna ports 0 to 3 are also referred to as cell-specific RS s (CRSs). In this example, the case of the antenna ports in which the number of CRSs is 4 is described, but the number thereof can be changed. For example, the CRS can use one antenna port or two antenna ports. Further, the CRS can shift in the frequency direction on the basis of the cell ID. For example, the CRS can shift in the frequency direction on the basis of a remainder obtained by dividing the cell ID by 6.

Resource element indicated by C1 to C4 indicates reference signals (CSI-RS) for measuring transmission path states of the antenna ports 15 to 22. The resource elements denoted by C1 to C4 indicate CSI-RS s of a CDM group 1 to a CDM group 4, respectively. The CSI-RS is constituted by an orthogonal sequence (orthogonal code) using a Walsh code and a scramble code using a pseudo random sequence. Further, the CSI-RS is code division multiplexed using an orthogonal code such as a Walsh code in the CDM group. Further, the CSI-RS is frequency-division multiplexed (FDM) mutually between the CDM groups.

The CSI-RS s of the antenna ports 15 and 16 are mapped to C1. The CSI-RSs of the antenna ports 17 and 18 is mapped to C2. The CSI-RSs of the antenna port 19 and 20 are mapped to C3. The CSI-RS s of the antenna port 21 and 22 are mapped to C4.

A plurality of antenna ports of the CSI-RS s is specified. The CSI-RS can be set as a reference signal corresponding to eight antenna ports of the antenna ports 15 to 22. Further, the CSI-RS can be set as a reference signal corresponding to four antenna ports of the antenna ports 15 to 18. Further, the CSI-RS can be set as a reference signal corresponding to two antenna ports of the antenna ports 15 to 16. Further, the CSI-RS can be set as a reference signal corresponding to one antenna port of the antenna port 15. The CSI-RS can be mapped to some sub frames, and, for example, the CSI-RS can be mapped for every two or more sub frames. A plurality of mapping patterns is specified for the resource element of the CSI-RS. Further, the base station device 1 can set a plurality of CSI-RS s in the terminal device 2.

The CSI-RS can set transmission power to zero. The CSI-RS with zero transmission power is also referred to as a zero power CSI-RS. The zero power CSI-RS is set independently of the CSI-RS of the antenna ports 15 to 22. Further, the CSI-RS of the antenna ports 15 to 22 is also referred to as a non-zero power CSI-RS.

The base station device 1 sets CSI-RS as control information specific to the terminal device 2 through the RRC signaling. In the terminal device 2, the CSI-RS is set through the RRC signaling by the base station device 1. Further, in the terminal device 2, the CSI-IM resources which are resources for measuring interference power can be set. The terminal device 2 generates feedback information using the CRS, the CSI-RS, and/or the CSI-IM resources on the basis of a setting from the base station device 1.

Resource elements indicated by D1 to D2 indicate the DL-DMRSs of the CDM group 1 and the CDM group 2, respectively. The DL-DMRS is constituted using an orthogonal sequence (orthogonal code) using a Walsh code and a scramble sequence according to a pseudo random sequence. Further, the DL-DMRS is independent for each antenna port and can be multiplexed within each resource block pair. The DL-DMRSs are in an orthogonal relation with each other between the antenna ports in accordance with the CDM and/or the FDM. Each of DL-DMRSs undergoes the CDM in the CDM group in accordance with the orthogonal codes. The DL-DMRSs undergo the FDM with each other between the CDM groups. The DL-DMRSs in the same CDM group are mapped to the same resource element. For the DL-DMRSs in the same CDM group, different orthogonal sequences are used between the antenna ports, and the orthogonal sequences are in the orthogonal relation with each other. The DL-DMRS for the PDSCH can use some or all of the eight antenna ports (the antenna ports 7 to 14). In other words, the PDSCH associated with the DL-DMRS can perform MIMO transmission of up to 8 ranks. The DL-DMRS for the EPDCCH can use some or all of the four antenna ports (the antenna ports 107 to 110). Further, the DL-DMRS can change a spreading code length of the CDM or the number of resource elements to be mapped in accordance with the number of ranks of an associated channel.

The DL-DMRS for the PDSCH to be transmitted through the antenna ports 7, 8, 11, and 13 are mapped to the resource element indicated by D1. The DL-DMRS for the PDSCH to be transmitted through the antenna ports 9, 10, 12, and 14 are mapped to the resource element indicated by D2. Further, the DL-DMRS for the EPDCCH to be transmitted through the antenna ports 107 and 108 are mapped to the resource element indicated by D1. The DL-DMRS for the EPDCCH to be transmitted through the antenna ports 109 and 110 are mapped to the resource element denoted by D2.

<Details of Downlink Resource Elements Mapping of NR in Present Embodiment>

Figure 11:
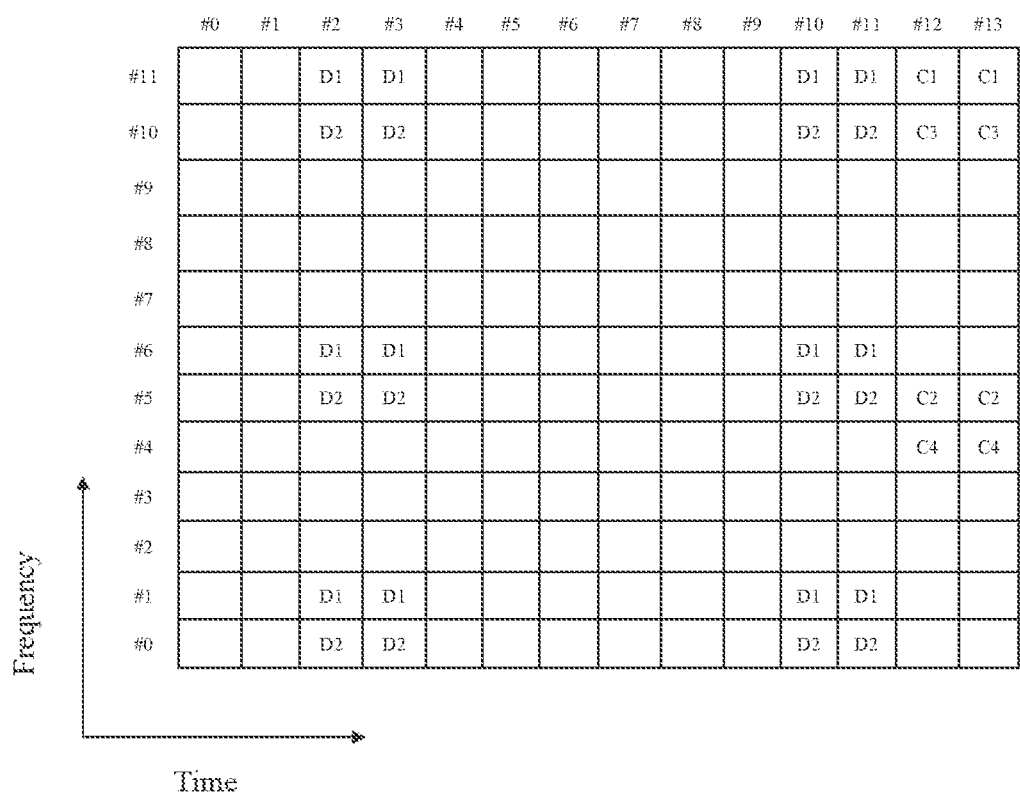
FIG. 11 is a diagram illustrating an example of downlink resource element mapping of NR of the present embodiment.

FIG. 11 is a diagram illustrating an example of the downlink resource element mapping of NR according to the present embodiment. FIG. 11 illustrates a set of resource elements in the predetermined resources in a case in which parameter set 0 is used. The predetermined resources illustrated in FIG. 11 are resources having the same time length and frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 11, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
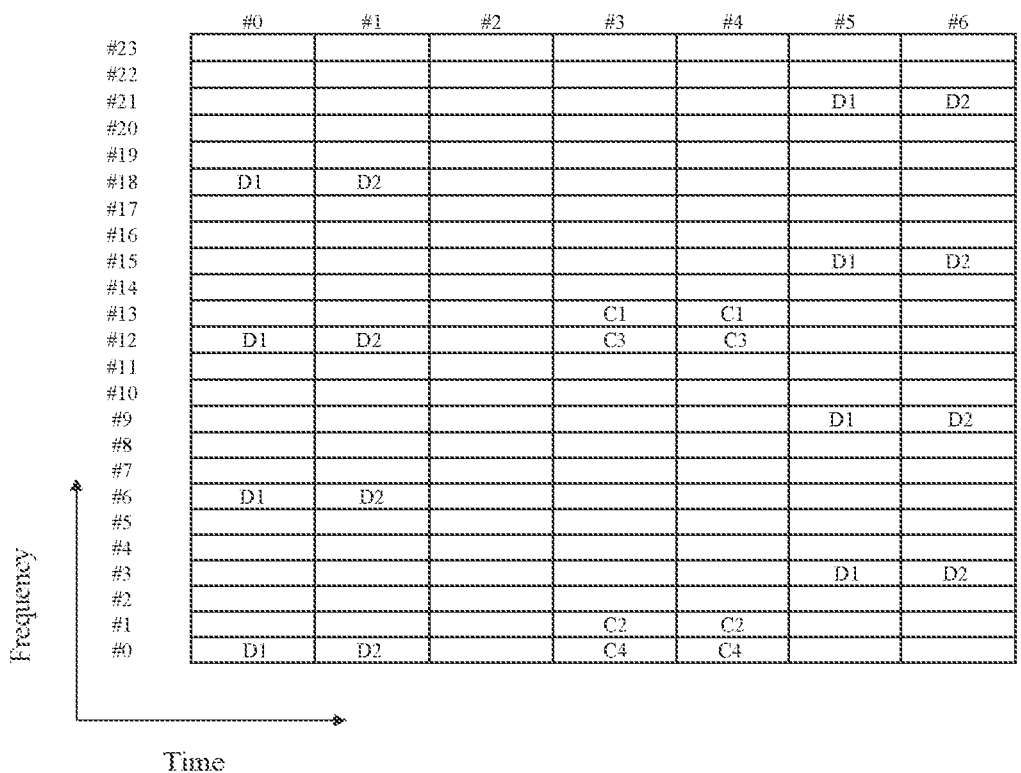
FIG. 12 is a diagram illustrating an example of downlink resource element mapping of NR of the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 13:
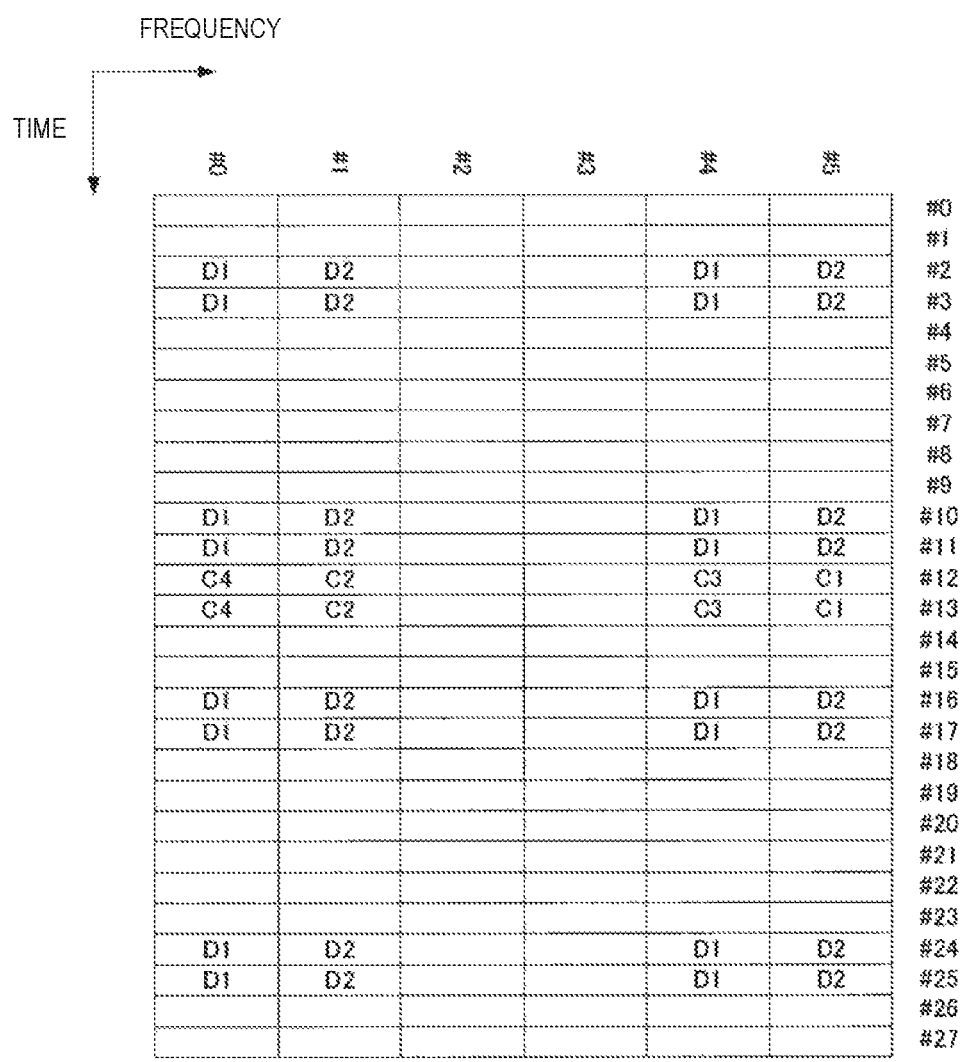
FIG. 13 is a diagram illustrating an example of downlink resource element mapping of NR of the present embodiment.

FIG. 13 is a diagram illustrating an example of the downlink resource element mapping of NR according to the present embodiment. FIG. 13 illustrates a set of resource elements in the predetermined resources in a case in which parameter set 1 is used. The predetermined resources illustrated in FIG. 13 are resources formed by the same time length and frequency bandwidth as one resource block pair in LTE.

In the example of FIG. 13, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Frame Configuration of NR in Present Embodiment>

Figure 14:
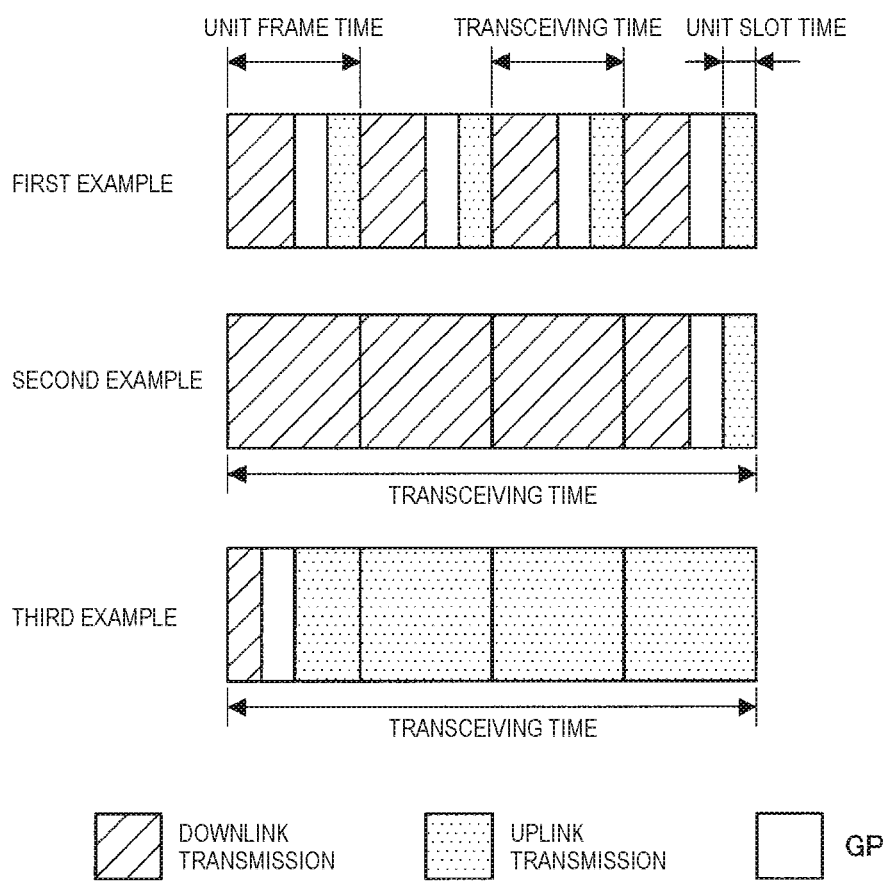
FIG. 14 is a diagram illustrating an example of a frame configuration of self-contained transmission of the present embodiment.

In NR, a physical channel and/or a physical signal can be transmitted by self-contained transmission. FIG. 14 illustrates an example of a frame configuration of the self-contained transmission in the present embodiment. In the self-contained transmission, single transceiving includes successive downlink transmission, a GP, and successive downlink transmission from the head in this order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, it is possible to realize low-delay communication of the downlink.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. A time (a gap) in which neither the physical channel nor the physical signal is transmitted may occupy between one transceiving and another transceiving. The terminal device 2 does not necessarily need to average the CSI measurement between different transceiving. The transceiving time may be referred to as TTI. One transceiving time is defined as, for example, an integer multiple of the sampling interval ($T_s$), the symbol length, the unit slot time, or the unit frame time of NR.

2. Technical Features

Hereinafter, technical features of the present embodiment will be described.

2.1. Entire Configuration

Figure 15:
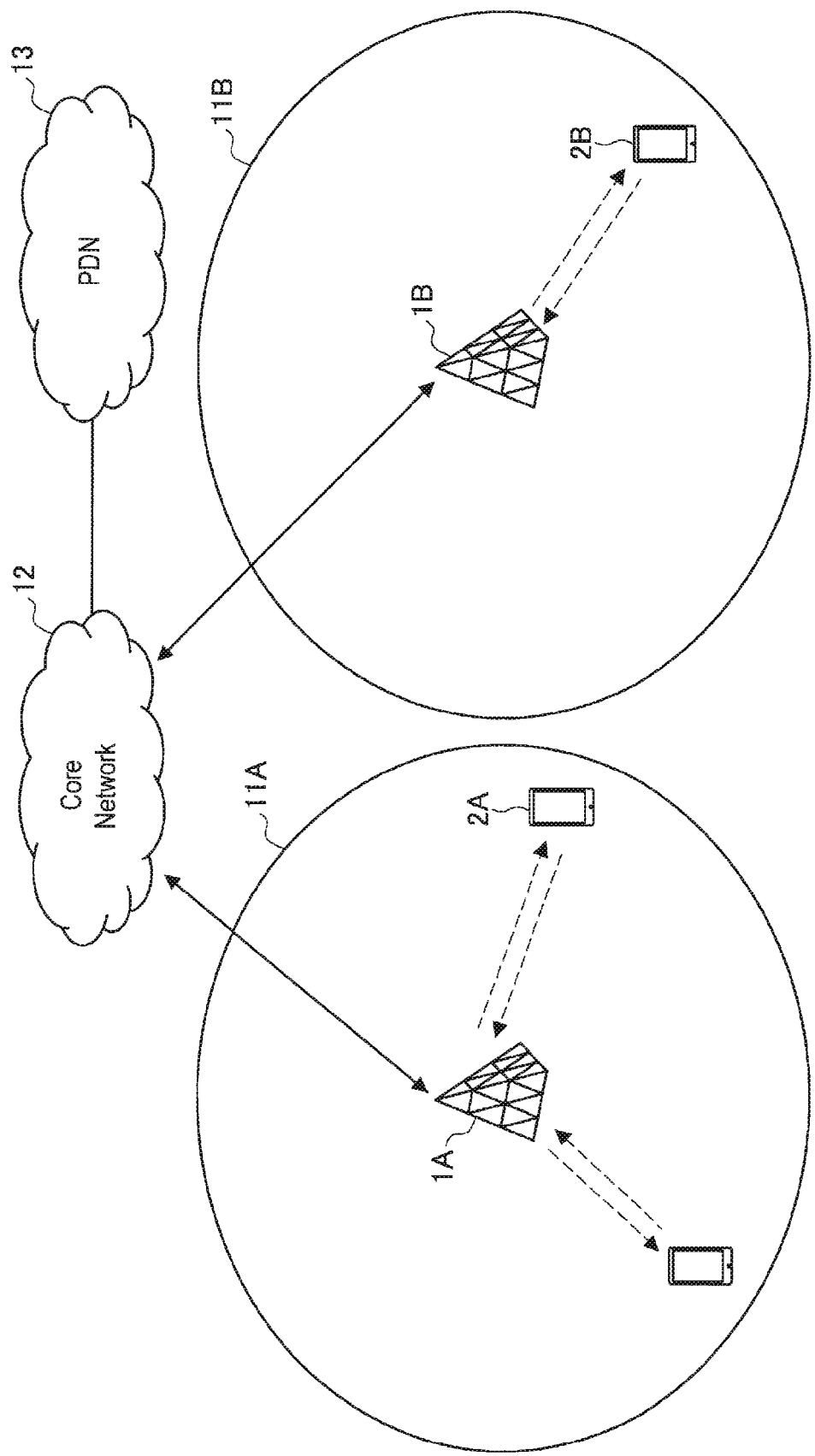
FIG. 15 is a diagram illustrating an entire configuration of a communication system of the present embodiment.

FIG. 15 is a diagram illustrating an entire configuration of a communication system of the present embodiment. As illustrated in FIG. 15, the communication system includes a plurality of base station devices 1, a plurality of terminal devices 2, a core network 12, and a packet data network (PDN) 13.

The base station device 1 operates a cell 11 and supplies a wireless communication service to one or more terminal devices 2 located inside the cell 11. The cell 11 is operated in conformity with, for example, any wireless communication scheme such as LTE or NR. The base station device 1 is connected to the core network 12. The core network 12 is connected to the packet data network (PDN) 13 via a gateway device (not illustrated).

The terminal device 2 performs wireless communication with the base station device 1 on the basis of control by the base station device 1. For example, the terminal device 2 measures a downlink signal from the base station device 1 and reports measurement information indicating a measurement result to the base station device 1. The base station device 1 controls wireless communication with the terminal device 2 on the basis of the reported measurement information (hereinafter also referred to as a measurement report in some cases). On the other hand, the terminal device 2 can transmit an uplink signal for measurement to the base station device 1. In this case, the base station device 1 measures an uplink signal from the terminal device 2 and controls the wireless communication with the terminal device 2 on the basis of the measurement information. In the measurement using the uplink signal, report in measurement using a downlink signal is not necessary, and thus it is possible to obtain measurement information more quickly. Therefore, for example, in a case in which a movement speed of the terminal device 2 is fast, it is preferable to perform measurement using an uplink signal.

The base station devices 1 can mutually transmit and receive information using an X2 interface. For example, the base station device 1 transmits measurement information regarding the terminal device 2 predicted to be handed over to another base station device 1 adjacent thereto. Thus, the stable handover is realized and stability of the wireless communication of the terminal device 2 is ensured.

2.2. Measurement

Hereinafter, measurement according to the present embodiment will be described.
<Uplink RS of NR According to Present Embodiment>

As uplink reference signals (RSs) in NR, there are an NR-SRS, an NR-DMRS, and the like.

An example of the NR-SRS will be described below. Note that unstated features can be considered to be similar to those of an SRS in LTE.

The NR-SRS may not be transmitted with a final symbol in a sub frame or a slot. For example, the NR-SRS may be transmitted with a first symbol or a halfway symbol in a sub frame or a slot.

The NR-SRS may be transmitted continuously with a plurality of symbols. For example, the NR-SRS may be transmitted with the last number symbol in a sub frame or a slot.
<Details of RRM in Present Embodiment>

The purpose of radio resource management (RRM) is to provide a method of efficiently using available radio resources. The RRM has functions such as radio bearer control (RBC), radio admission control (RAC), connection mobility control (CMC), dynamic resource allocation (DRA)-packet scheduling (PS), inter-cell interference coordination (ICIC), load balancing (LB), inter-RAT radio resource management, subscriber profile (ID) for RAT/ frequency priority, inter-eNB COMP between base stations, cell ON/OFF, and cell discovery.

For example, information regarding the RRM is used to determine handover between cells. The base station device 1 determines whether or not to release the terminal device 2 on the basis of a measurement report or RRM information received from the terminal device 2. Through the handover process, mobility control, load balancing and the like are realized.

<Downlink RRM Measurement in Present Embodiment>

In downlink RRM measurement, information regarding a propagation path is measured using a downlink signal sent from the base station device 1. The terminal device 2 measures the information of the propagation path used in the RRM using the downlink signal. The information regarding the propagation path used in the RRM (RRM measurement information) is channel information between the base station device 1 and the terminal device 2 and is information regarding reception power and interference. The RRM measurement information is information that is averaged over a long time and/or in a broader band than information regarding CSI. Specifically, the RRM measurement information is, for example, reference signal received power (RSRP), reference signal received quality (RSRQ), a received signal strength indicator (RSSI), a signal to interference plus noise ratio (SINR), or the like.

The RSRP is a numerical value indicating reception power of a reference signal. Specifically, the RSRP is defined as a linear average of power values of resource elements carrying a reference signal in an assumed measurement frequency bandwidth. A reference signal used to measure the RSRP is a reference signal (CRS) set inherently in a cell, a reference signal (CSI-RS) set inherently in a terminal, or the like. Note that the reference signal measuring the RSRP may be a reference signal (beamformed RS: BRS) set inherently in a beam. In a case in which setting related to measurement sub frames is realized in the terminal device 2 from a higher layer, the RSRP is measured in at least one sub frame among the measurement sub frames. Note that in a case in which setting related to measurement sub frames is realized in the terminal device 2 from a higher layer, the RSRP may be measured in sub frames other than the measurement sub frames.

The RSRQ is a numerical value indicating reception quality of a reference signal. Specifically, the RSRQ is defined as the number of resource blocks of a measurement bandwidth×RSRP/RSSI.

The RSSI is a numerical value indicating reception power intensity. Specifically, the RSSI is defined as a linear average of total reception power values of predetermined OFDM symbols of a measurement sub frame. The predetermined OFDM symbols are decided on the basis of a higher layer instruction. The RSSI is measured using all the OFDM symbols of a sub frame when an instruction is given from a higher layer. Conversely, the RSSI is measured using OFDM symbols included in a reference signal with which the RSRP is measured in a case in which no instruction is given from a higher layer.

The SINR is a ratio of reception power from a predetermined cell and reception power from a cell other than the predetermined cell to a sum of noise power. For example, the SINR is defined as RSRP/(RSSI−number of resource blocks of a measurement bandwidth×RSRP).

Downlink RRM measurement information is shared between the base station devices 1 using a backhaul line such as an X2 interface or an S1 interface.

<Downlink RRM Report in Present Embodiment>

Information regarding downlink RRM measurement is reported from the terminal device 2 in which the information is measured to a serving cell in the case of a trigger.

As an example of a trigger type, there is a trigger by an event. As events, a case in which an RRM measurement result of a serving cell is better than a threshold (Event A1), a case in which an RRM measurement result of a serving cell is less than the threshold (Event A2), a case in which a sum of an offset value and an RRM measurement result of an adjacent cell is better than an RRM measurement result of a primary cell or a primary cell and a primary secondary cell (Event A3), a case in which an RRM measurement result of an adjacent cell is better than a threshold (Event A4), a case in which an RRM measurement result of a primary cell or a primary cell and a secondary cell is less than a first threshold and is better than the second threshold (Event A5), and a case in which a sum of an offset and an RRM measurement result of an adjacent cell is better than an RRM measurement result of the secondary cell (Event A6) can be exemplified.

As an example of a trigger type, there is a periodic trigger.

The terminal device 2 transmits a result of the downlink RRM measurement loaded on a PUSCH to the base station device 1 in a case in which a condition of one of the foregoing events is satisfied and an opportunity to transmit the PUSCH arises. Thus, the base station device 1 and the network can acquire RRM measurement information of each terminal device 2.

<Uplink RRM Measurement in Present Embodiment>

In the uplink RRM measurement, information regarding a propagation path is measured using an uplink signal sent from the terminal device 2.

When the uplink RRM measurement is performed, the terminal device 2 transmits an RS (RRM measurement uplink RS) for the RRM measurement. The base station device 1 performs the RRM measurement from the RRM measurement uplink RS.

Note that in the uplink RRM measurement, measurement defined similarly to the measurement information of the downlink RRM measurement may be performed. Specifically, the base station device 1 may measure the RSRP, the RSRQ, the RSSI, and/or the SINR from the RRM measurement uplink RS.

Note that in the uplink RRM measurement, similar trigger types to the downlink RRM measurement may be used.

Note that in the uplink RRM measurement, an RRM measurement uplink RS may be transmitted along with the PUSCH. Then, the PUSCH may be used to report the downlink RRM measurement. Information regarding the downlink RRM measurement included in the PUSCH preferably includes information regarding downlink interference (for example, the RSRQ, the RSSI, and the SINR).

The information regarding the uplink RRM measurement is shared between the base station devices 1 using a backhaul line such as an X2 interface or an S1 interface. The base station device 1 can transfer the measured information regarding the uplink RRM measurement to an adjacent base station connected with the backhaul line.

Note that a similar process to the foregoing uplink RRM measurement may be applied to measure channel information between the terminal device 2 and the terminal device 2 in the sidelink. That is, the terminal device 2 may transmit the RRM measurement uplink RS to the other connected terminal device 2. The terminal device 2 may perform the RRM measurement on the basis of the RRM measurement uplink RS transmitted from the other terminal device 2.

<CSI Measurement Uplink RS in Present Embodiment>

The CSI measurement uplink RS is used to obtain CSI information in an uplink. Note that the RRM measurement may be performed using the CSI measurement uplink RS.

An example of the CSI measurement uplink RS in NR is an NR-SRS. The NR-SRS is set to be transmitted from a higher layer such as the RRC layer.

Transmission power of the CSI measurement uplink RS is calculated on the basis of a path loss from the serving cell. Transmission power of the RRM measurement uplink RS is calculated on the basis of a path loss and information instructed from a higher layer. The path loss is a path loss of a downlink or an uplink. Thus, signal interference in the uplink can be caused to be reduced.

A transmission period of the CSI measurement uplink RS is a short interval. Specifically, the transmission period of the CSI measurement uplink RS is set between several milliseconds and tens of milliseconds. The transmission period of the CSI measurement uplink RS is shorter than the transmission period of the RRM measurement uplink RS.

A transmission bandwidth of the CSI measurement uplink RS is a wideband or a subband.

A signal waveform with which the CSI measurement uplink RS is transmitted is cyclic prefix orthogonal frequency division multiplexing (CP-OFDM) or discrete Fourier transform-spread-orthogonal frequency division multiplexing (DFT-s-OFDM).

A beam of the CSI measurement uplink RS is oriented in a predetermined direction. In other words, a precoder or a codebook used in the CSI measurement uplink RS is limited by a higher layer. In addition, a beam width of the CSI measurement uplink RS is preferably narrower than a beam width of the RRM measurement uplink RS.

A frequency density of the CSI measurement uplink RS is preferably a high density. Specifically, an example of RE mapping of the CSI measurement uplink RS is continuous mapping on a frequency. An example of RE mapping of the CSI measurement uplink RS is mapping in a comb shape (that is, one skip). Thus, channel estimation can be performed with precision sufficient for frequency selectivity fading.

A timing advance of the CSI measurement uplink RS is decided on the basis of a timing advance (TA) command unique to the terminal device 2.

The CSI measurement uplink RS may be subjected to frequency hopping. Setting of the CSI measurement uplink RS includes a parameter for giving an instruction for the frequency hopping.

<RRM Measurement Uplink RS in Present Embodiment>

The RRM measurement uplink RS is used for RRM measurement in an uplink. Note that the CSI measurement of the uplink may be performed using the RRM measurement uplink RS.

An example of the RRM measurement uplink RS in NR is an NR-SRS, which has different setting from the CSI measurement uplink RS.

An example of the RRM measurement uplink RS in NR may be an NR-DMRS. The RRM measurement uplink RS may be transmitted along with an NR-PUSCH or an NR-PUCCH.

An example of the RRM measurement uplink RS in NR may be an NR-PRACH.

Transmission power of the RRM measurement uplink RS is calculated independently from the path loss from the serving cell. Transmission power of the RRM measurement uplink RS is calculated on the basis of information instructed from a higher layer and is not based on the path loss. Thus, the base station device 1 can measure path loss of the uplink.

A transmission period of the RRM measurement uplink RS is a long interval. Specifically, the transmission period of the RRM measurement uplink RS is set between tens of milliseconds and hundreds of milliseconds. The transmission period of the RRM measurement uplink RS is longer than the transmission period of the CSI measurement uplink RS. Thus, low power consumption can be achieved.

A transmission bandwidth of the RRM measurement uplink RS may be a subband but is preferably a wideband.

A signal waveform with which the RRM measurement uplink RS is transmitted may be CP-OFDM, but is preferably DFT-s-OFDM.

A beam of the RRM measurement uplink RS is oriented omnidirectionally. In other words, a precoder or a codebook used in the RRM measurement uplink RS is not limited. In addition, a beam width of the RRM measurement uplink RS is preferably broader than a beam width of the CSI measurement uplink RS.

A frequency density of the RRM measurement uplink RS is preferably a low density. Specifically, an example of RE mapping of the CSI measurement uplink RS is mapped at a rougher interval than the comb shape (that is, one skip). An example of the RE mapping of the CSI measurement uplink RS is mapping to one or two REs with regard to one resource block. Thus, the wideband and the low transmission power can be achieved.

Timing advance of the RRM measurement uplink RS is decided on the basis of a TA command different from the TA command for the CSI measurement uplink RS. Alternatively, the timing advance of the RRM management uplink RS is not set and an offset value is 0.

The RRM measurement uplink RS is not subjected to frequency hopping. Setting of the RRM measurement uplink RS does not include a parameter for giving an instruction for the frequency hopping.

<Switching of RRM Measurement in Present Embodiment>

The network can switch between the downlink RRM measurement and the uplink RRM measurement in accordance with a situation. For example, of the downlink RRM measurement and the uplink RRM measurement, one RRM measurement is applied when a predetermined condition is satisfied, and the other RRM measurement is applied otherwise.

The downlink RRM measurement and the uplink RRM measurement are switched on the basis of predetermined conditions.

For example, in the terminal device 2, the uplink RRM measurement is applied in a case in which a first condition is satisfied. The downlink RRM measurement is applied in a case in which a second condition is satisfied. In a case in which the uplink RRM measurement is applied, the terminal device 2 (for example, the transmitting unit 207) transmits the RRM measurement uplink RS (equivalent to a first uplink reference signal) on the basis of setting related to the uplink RRM measurement (equivalent to first setting related to radio resource measurement for management). In a case in which the downlink RRM measurement is applied, the terminal device 2 (for example, the channel measuring unit 2059) performs the downlink RRM measurement on the basis of the downlink RS. That is, in a case in which the first condition is satisfied, the terminal device 2 transmits the RRM measurement uplink RS. In a case in which the second condition is satisfied, the terminal device 2 performs the downlink RRM measurement using the downlink RS.

On the other hand, in the base station device 1 as well, in a case in which the first condition is satisfied, the uplink RRM measurement is applied. In a case in which the second condition is satisfied, the downlink RRM measurement is applied. Specifically, in the case in which the uplink RRM measurement is applied, the base station device 1 (for example, the channel measuring unit 1059) performs uplink measurement (equivalent to first uplink measurement) on the basis of the RRM measurement uplink RS transmitted by the terminal device 2. In addition, the base station device 1 (for example, the transmitting unit 107) transmits the downlink RS. In particular, in the case in which the downlink RRM measurement is applied, the base station device 1 transmits the downlink RS. That is, in a case in which the first condition is satisfied, the base station device 1 performs the uplink measurement on the basis of the RRM measurement uplink RS. In a case in which the second condition is satisfied, the base station device 1 transmits the downlink RS.

Here, the reason for the predetermined conditions will be described. In the measurement in which the uplink signal is used, since a report is not necessary in measurement using the downlink signal, measurement information can be obtained more quickly. Therefore, in a case in which lower delay is required, it is preferable to transmit the RRM measurement uplink RS and perform measurement on the side of the base station device 1 rather than performing the measurement based on the downlink RS on the side of the terminal device 2. Accordingly, it may be ascertained that a case in which low delay is required is regulated as a first condition and other cases are regulated as a second condition. Of course, the predetermined conditions may be regulated in accordance with other standards.

Hereinafter, specific examples of the predetermined conditions will be described.

Figure 16:
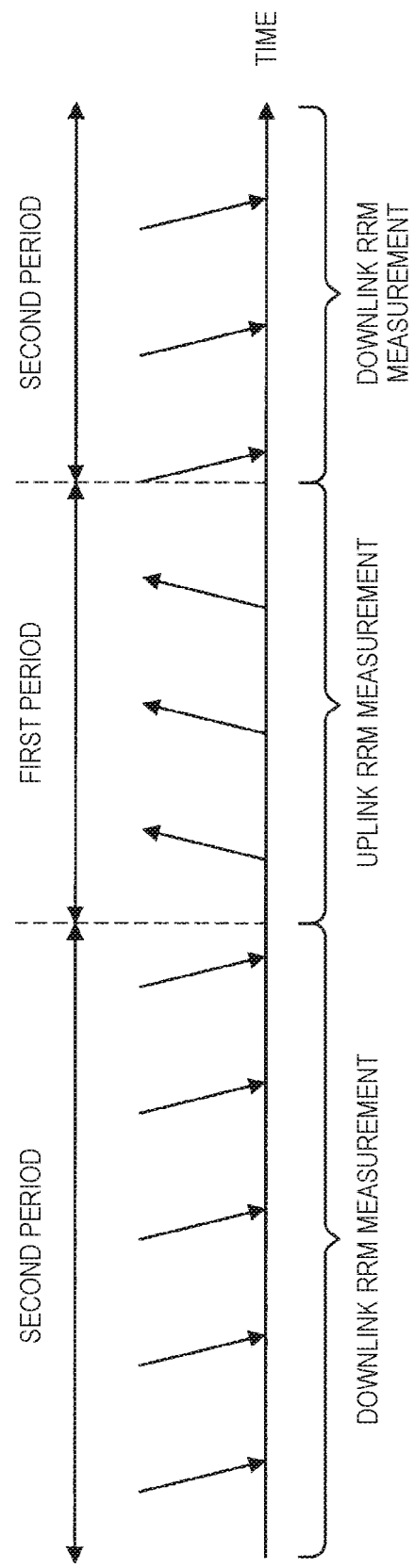
FIG. 16 is a diagram illustrating an example of switching between downlink RRM measurement and uplink RRM measurement of the present embodiment.

As examples of the predetermined condition, time resources can be exemplified. For example, an example of a case in which the examples of the predetermined conditions are a first period and a second period will be described with reference to FIG. 16. FIG. 16 is a diagram illustrating an example of switching between the downlink RRM measurement and the uplink RRM measurement of the present embodiment. For example, in the case in which the time resource is the first period, the uplink RRM measurement is applied. In the case in which the time resource is the second period, the downlink RRM measurement is applied. In a case in which the uplink RRM measurement is applied, the terminal device 2 transmits the RRM measurement uplink RS on the basis of the setting related to the uplink RRM measurement. In a case in which the downlink RRM measurement is applied, the terminal device 2 performs the downlink RRM measurement using the downlink RS. Note that the period may be any time resource. For example, the period may be any unit time resource such as a symbol, a sub frame, or a frame or may be one unit time resource or a plurality of unit time resources.

As an example of the predetermined condition, a DRX period can be exemplified. Specifically, in a case in which the predetermined condition is not the DRX period, the downlink RRM measurement is applied. In a case in which the predetermined condition is the DRX period, the uplink RRM measurement is applied. In other words, in a case in which the first condition is satisfied, a target time resource is within a DRX section. In a case in which the second condition is satisfied, the target time resource is outside of the DRX section.

As examples of the predetermined conditions, terminal modes can be exemplified. Specifically, in a case in which the terminal device 2 is in an idle mode or an inactive mode, the downlink RRM measurement is applied. In a case in which the terminal device 2 is in a connection mode, the uplink RRM measurement is applied. In other words, in the case in which the first condition is satisfied, the terminal device 2 may be in the connection mode. In the case in which the second condition is satisfied, the terminal device 2 may be in the idle mode or the inactive mode. Note that the inactive mode is a mode that has a middle implication between the connection mode and the idle mode. For example, in the inactive mode, the terminal device 2 and the network maintain a context and the terminal device 2 is sleeping.

As examples of the predetermined conditions, mobility states of the terminal device 2 can be exemplified. Specifically, in the terminal device 2 in a normal-mobility state, the downlink RRM measurement is applied. In the terminal device 2 in a high-mobility state, the uplink RRM measurement is applied. Note that in the terminal device 2 in a medium-mobility state, the downlink RRM measurement may be applied, but the uplink RRM measurement is preferably applied.

As examples of the predetermined conditions, target frequency resources to be measured can be exemplified. Specifically, in a case in which the target frequency to be measured is the same frequency as that of the serving cell (that is, the case of intra-frequency measurement), the downlink RRM measurement is applied. In a case in which the target frequency to be measured is a frequency different from that of the serving cell (that is, the case of inter-frequency measurement), the uplink RRM measurement is applied.

As examples of the predetermined conditions, beam operation methods can be exemplified. Specifically, in a cell that performs a multi-beam operation, the downlink RRM measurement is applied. In a cell that performs a single beam operation, the uplink RRM measurement is applied.

Note that a plurality of combinations of the examples of the foregoing predetermined conditions may be applied.

<Switching of Uplink RS Transmission in Present Embodiment>

The terminal device 2 can switch between transmission of the RRM measurement uplink RS and transmission of the CSI measurement uplink RS (equivalent to a second uplink reference signal) in accordance with a situation.

The RRM measurement uplink RS and the CSI measurement uplink RS are each transmitted with different resources for which at least one of the time resource or the frequency resource is different. Specifically, either the RRM measurement uplink RS or the CSI measurement uplink RS is transmitted with a predetermined time resource (for example, a sub frame, a slot, a mini-slot, or a symbol) and a predetermined frequency resource (for example, a carrier). That is, the terminal device 2 capable of transmitting the RRM measurement uplink RS and the CSI measurement uplink RS transmits one uplink RS when a predetermined condition is satisfied at a predetermined timing at which the uplink RS is transmitted, and transmits the other uplink RS otherwise. In addition, with the predetermined frequency resource, the RRM measurement uplink RS and the CSI measurement uplink RS are not simultaneously transmitted. That is, with the predetermined frequency resource, the terminal device 2 transmits only one uplink RS without simultaneously transmitting the CSI measurement uplink RS and the RRM measurement uplink RS and destroys the other uplink RS.

The transmission of the RRM measurement uplink RS and the CSI measurement uplink RS is switched on the basis of a predetermined condition.

For example, in a case in which a third condition is satisfied, the terminal device 2 transmits the RRM measurement uplink RS on the basis of the setting related to the uplink RRM measurement. In addition, in a case in which a fourth condition is satisfied, the terminal device 2 transmits the CSI measurement uplink RS on the basis of the setting related to the uplink CSI measurement (equivalent to second setting different from the first setting).

On the other hand, in the case in which the third condition is satisfied, the base station device 1 performs uplink measurement on the basis of the RRM measurement uplink RS transmitted by the terminal device 2. In addition, in the case in which the fourth condition is satisfied, the base station device 1 performs uplink measurement (equivalent to second uplink measurement) on the basis of the CSI measurement uplink RS transmitted by the terminal device 2.

Here, implication of the predetermined conditions will be described. In RRM measurement, long-term link information can be obtained. For example, the RRM measurement is used for cell selection or the like. On the other hand, for example, in CSI measurement other than the RRM, instantaneous link information can be obtained. For example, the CSI measurement is used for link adaptation. Accordingly, it may be ascertained that the case in which long-term link information is obtained is regulated as the first condition and the other cases are regulated as the second condition. Of course, the predetermined conditions may be regulated in accordance with other standards. For example, a case in which a movement speed of the terminal device 2 is fast may be regulated as the first condition, and the other cases may be regulated as the second condition.

Hereinafter, specific examples of the predetermined conditions will be described.

Figure 17:
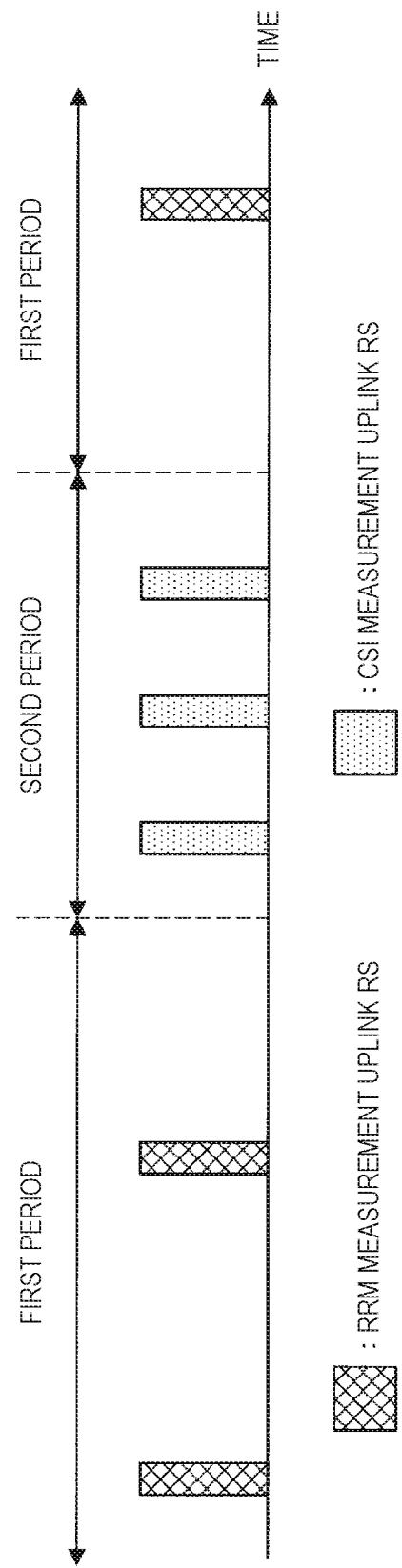
FIG. 17 is a diagram illustrating an example of switching between uplink RS transmission for RRM measurement and uplink RS transmission of CSI measurement of the present embodiment.

As examples of the predetermined condition, time resources can be exemplified. For example, an example of a case in which the examples of the predetermined conditions are a first period and a second period will be described with reference to FIG. 17. FIG. 17 is a diagram illustrating an example of switching between transmission of the RRM measurement uplink RS and transmission of CSI measurement RS of the present embodiment. In the case in which the time resource is the first period, the terminal device 2 transmits the RRM measurement uplink RS on the basis of the setting related to the uplink RRM measurement. In the case in which the time resource is the second period, the terminal device 2 transmits the CSI measurement uplink RS on the basis of the information regarding the uplink CSI measurement.

As an example of the predetermined condition, a DRX period can be exemplified. Specifically, in a case in which the predetermined condition is the DRX period, the RRM measurement uplink RS is transmitted. In a case in which the predetermined condition is not the DRX period, the CSI measurement uplink RS is transmitted.

As an example of the predetermined condition, activation/deactivation can be exemplified. Specifically, in a case in which the predetermined condition is the deactivation, the RRM measurement uplink RS is transmitted. In a case in which the predetermined condition is the activation, the CSI measurement uplink RS is transmitted.

As examples of the predetermined conditions, terminal modes can be exemplified. Specifically, in a case in which the terminal device is in an idle mode or an inactive mode, the RRM measurement uplink RS is transmitted. In a case in which the terminal device is in a connection mode, the CSI measurement uplink RS is transmitted.

As examples of the predetermined conditions, a channel guarantee period in an unlicensed band can be exemplified. Specifically, during a period in which a channel is not guaranteed in the unlicensed band, the RRM measurement uplink RS is transmitted. During a period in which a channel is guaranteed in the unlicensed band, the CSI measurement uplink RS is transmitted.

Figure 18:
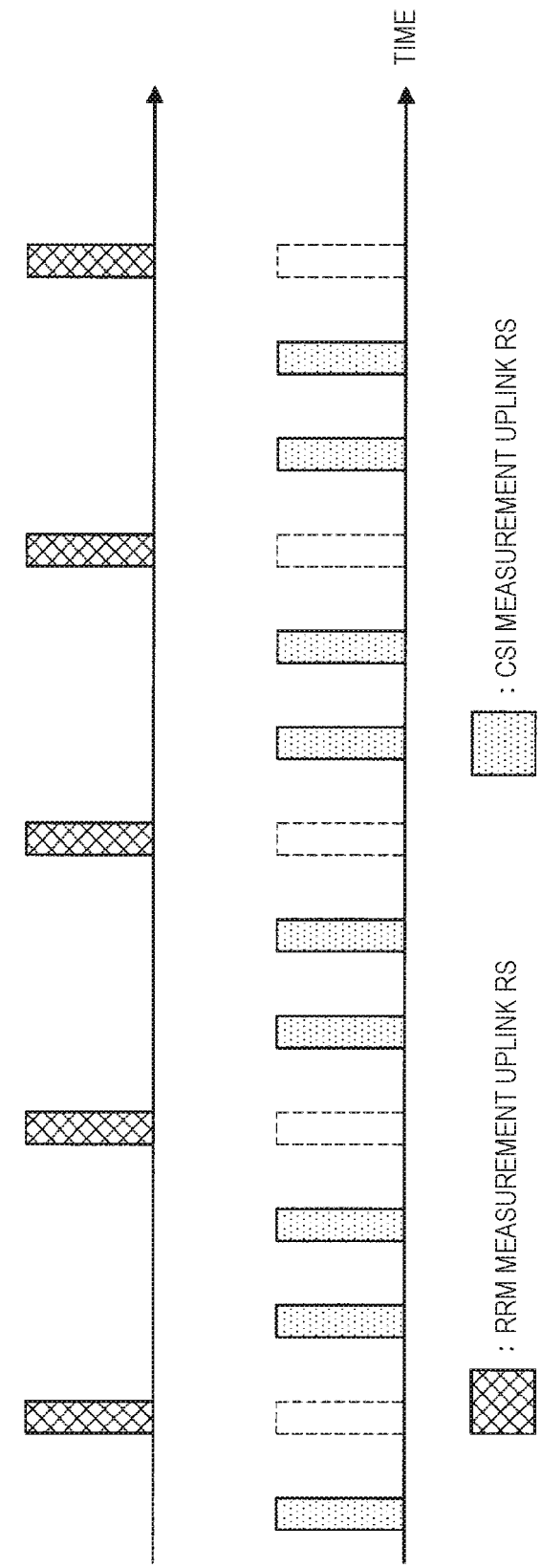
FIG. 18 is a diagram illustrating an example of switching between uplink RS transmission for RRM measurement and uplink RS transmission of CSI measurement of the present embodiment.

As examples of the predetermined conditions, a case in which transmission timings of the RRM measurement uplink RS and the CSI measurement uplink RS overlap can be exemplified. The example will be described with reference to FIG. 18. FIG. 18 is a diagram illustrating an example of switching between uplink RS transmission for RRM measurement and uplink RS transmission of CSI measurement of the present embodiment. FIG. 18 illustrates an example of a case in which transmission timings of the RRM measurement uplink RS and the CSI measurement uplink RS overlap. Specifically, in a case in which both transmission of the RRM measurement uplink RS and transmission of the CSI measurement uplink RS occur at a predetermined transmission timing, the RRM measurement uplink RS is transmitted. In a case in which only transmission of the RRM measurement uplink RS occurs at the predetermined transmission timing, the RRM measurement uplink RS is transmitted. In a case in which only transmission of the CSI measurement uplink RS occurs at the predetermined transmission timing, the CSI measurement uplink RS is transmitted. In other words, the case in which the third condition is satisfied is a timing at which the target time resource is instructed in the setting related to the uplink RRM measurement. In addition, in the case in which the case in which the fourth condition is satisfied, the target time resource is a transmission timing instructed in the setting related to the uplink CSI measurement and is not a transmission timing instructed in the setting related to the uplink RRM measurement.

As an example of the predetermined condition, a case in which a value of RSRP of the serving cell or a value of radio link quality measured in RLM measurement is less than a predetermined value can be exemplified. Specifically, in the case in which the value of RSRP of the serving cell or the value of the radio link quality measured in the RLM measurement is less than the predetermined value, the RRM measurement uplink RS is transmitted at a predetermined transmission timing. In a case in which the value of RSRP of the serving cell or the value of the radio link quality measured in the RLM measurement is greater than the predetermined value, the CSI measurement uplink RS is transmitted at the predetermined transmission timing.

As an example of the predetermined condition, a case in which a timer associated with uplink RRM measurement expires can be exemplified. Specifically, in the case in which the timer associated with the uplink RRM measurement expires, the RRM measurement uplink RS is transmitted at a predetermined transmission timing. In a case in which the timer associated with the uplink RRM measurement does not expire, the CSI measurement uplink RS is transmitted at the predetermined transmission timing. The timer is subtracted in units of sub frames. The timer is reset in a case in which the RRM measurement uplink RS is transmitted.

As an example of the predetermined condition, a case in which the transmission is triggered by the DCI can be exemplified. Specifically, in a case in which the transmission of the RRM measurement uplink RS is triggered by the DCI, the RRM measurement uplink RS is transmitted. In a case in which the transmission of the CSI measurement uplink RS is triggered by the DCI, the CSI measurement uplink RS is transmitted.

As an example of the predetermined condition, a target frequency to be measured can be exemplified. Specifically, in a case in which the target frequency to be measured is the same frequency as that of the serving cell (that is, the case of intra-frequency measurement), the CSI measurement uplink RS is transmitted. In a case in which the target frequency to be measured is a frequency different from that of the serving cell (that is, the case of inter-frequency measurement), the RRM measurement uplink RS is transmitted. Note that this condition may be reverse. That is, in the case in which the target frequency to be measured is the same reference as that of the serving cell, the RRM measurement uplink RS is transmitted. In a case in which the target frequency to be measured is a frequency different from that of the serving cell, the CSI measurement uplink RS may be transmitted. In addition, in a case in which a target frequency resource to be measured (for example, a carrier) is deactivation, the RRM measurement uplink RS may be transmitted. In a case in which the target frequency resource to be measured may be activation, the CSI measurement uplink RS may be transmitted. In other words, in the case in which the third condition is satisfied, the target frequency resource is deactivation. In the case in which the fourth condition is satisfied, the target frequency resource may be activation.

As an example of the predetermined condition, setting of the downlink RRM measurement can be exemplified. Specifically, in a case in which the downlink RRM measurement is set, the CSI measurement uplink RS is transmitted. In a case in which the downlink RRM measurement is not set, the RRM measurement uplink RS is transmitted.

As an example of the predetermined condition, a cell to be measured can be exemplified. Specifically, in a case in which serving cell RRM measurement is performed, the CSI measurement uplink RS is transmitted. In a case in which adjacent cell RRM measurement is performed, the RRM measurement uplink RS is transmitted.

Note that the RRM measurement uplink RS may be transmitted in a case in which the foregoing predetermined condition is satisfied and an opportunity to transmit the RRM measurement uplink RS is obtained.

Note that a plurality of combinations of the examples of the foregoing predetermined conditions may be applied.

<Communication Between Base Stations in Present Embodiment>

The base station device 1 (for example, the higher layer processing unit 101: equivalent to a transfer unit) can transfer measurement information obtained through the uplink measurement based on the above-described RRM measurement uplink RS to an adjacent base station. In addition, the base station device 1 may transfer measurement information obtained through the uplink measurement on the basis of the CSI measurement uplink RS and/or measurement information reported from the terminal device 2 performing the downlink measurement based on the RRM measurement downlink RS to the adjacent base station. In addition, the base station device 1 may control wireless communication with the terminal device 2 which is a target of the measurement information on the basis of the measurement information transferred from the adjacent base station. Through the communication between the base stations, stable handover is realized and stability of the wireless communication of the terminal device 2 is ensured.

<Details of Procedure of RRM Measurement in Present Embodiment>

Hereinafter, a procedure of RRM measurement by the base station device 1 and the terminal device 2 will be described with reference to FIGS. 19 to 21.

Figure 19:
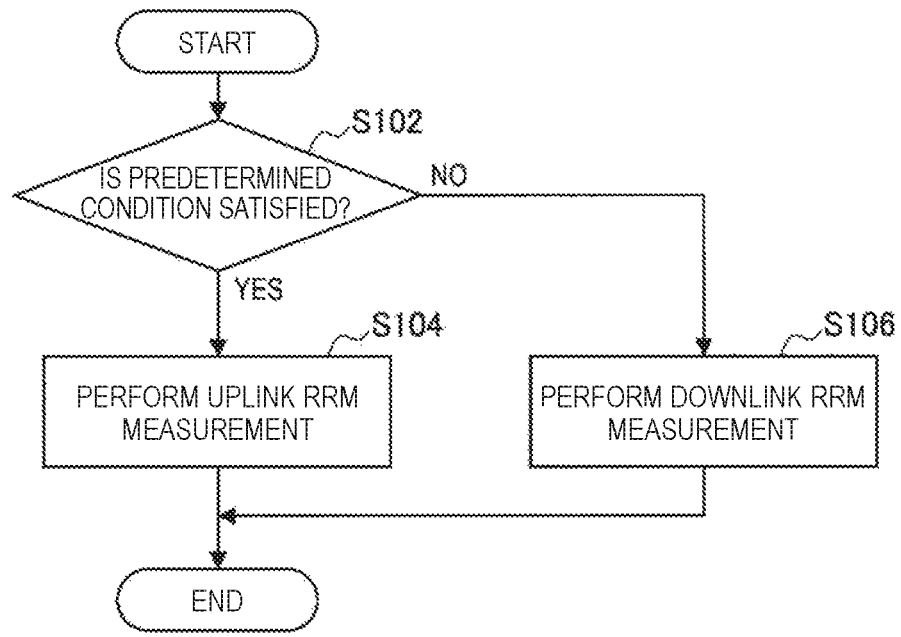
FIG. 19 is a diagram illustrating an example of a flow of a procedure for RRM measurement performed in a base station device and a terminal device of the present embodiment.

FIG. 19 is a diagram illustrating an example of a flow of a procedure for RRM measurement performed in the base station device 1 and the terminal device 2 of the present embodiment. The present procedure relates to switching between the downlink RRM measurement and the uplink RRM measurement. As illustrated in FIG. 19, the base station device 1 and the terminal device 2 determine whether or not the predetermined condition is satisfied (step S102). In a case in which it is determined that the predetermined condition is satisfied (YES in step S102), the uplink RRM measurement is applied (step S104). That is, the terminal device 2 transmits the RRM measurement uplink RS and the base station device 1 performs the RRM measurement on the basis of the RRM measurement uplink RS. Conversely, in a case in which it is determined that the predetermined condition is not satisfied (NO in step S102), the downlink RRM measurement is applied (step S106). That is, the base station device 1 transmits the RRM measurement downlink RS and the terminal device 2 performs the RRM measurement on the basis of the RRM measurement uplink RS.

Figure 20:
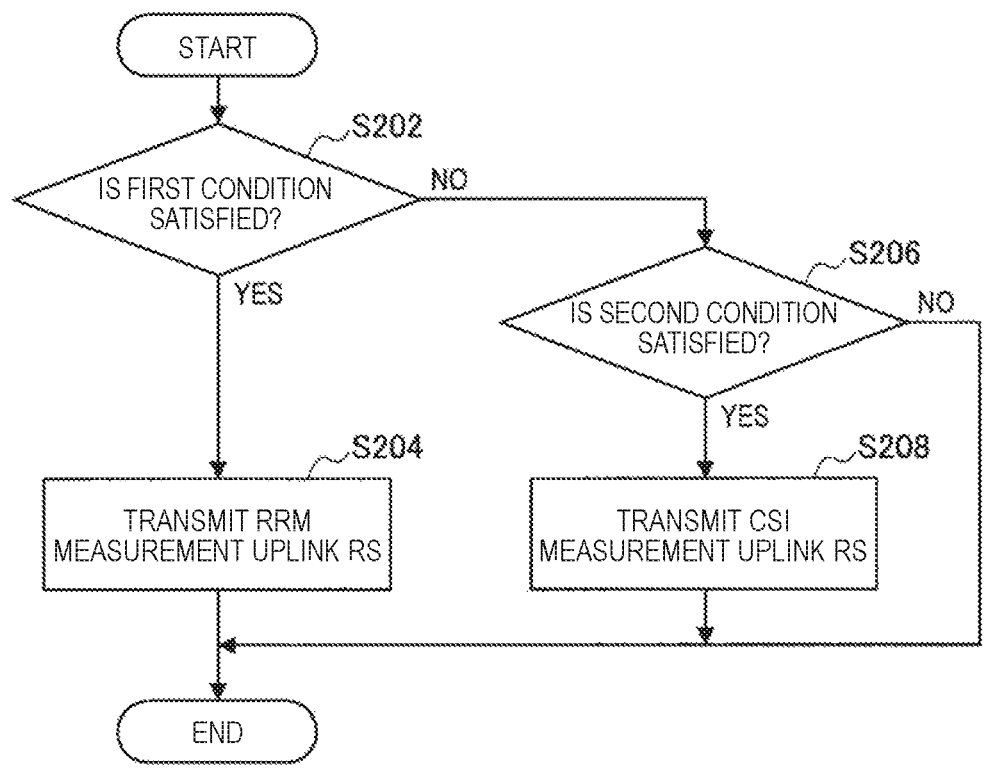
FIG. 20 is a diagram illustrating an example of a flow of a procedure for RRM measurement performed in a base station device and a terminal device of the present embodiment.

FIG. 20 is a diagram illustrating an example of a flow of a procedure for RRM measurement performed in the base station device 1 and the terminal device 2 of the present embodiment. The present procedure relates to switching between transmission of the RRM measurement uplink RS and transmission of the CSI measurement uplink RS. As illustrated in FIG. 20, the base station device 1 and the terminal device 2 determine whether or not the first condition is satisfied (step S202). In a case in which it is determined that the first condition is satisfied (YES in step S202), the transmission of the RRM measurement uplink RS is performed (step S204). That is, the terminal device 2 transmits the RRM measurement uplink RS and the base station device 1 performs the RRM measurement on the basis of the RRM measurement uplink RS. Conversely, in a case in which it is determined that the first condition is not satisfied (NO in step S202), the base station device 1 and the terminal device 2 determine whether or not the second condition is satisfied (step S206). In a case in which it is determined that the second condition is satisfied (YES in step S206), the transmission of the CSI measurement uplink RS is performed (step S208). That is, the terminal device 2 transmits the CSI measurement uplink RS and the base station device 1 performs the CSI measurement on the basis of the CSI measurement uplink RS. Conversely, in a case in which it is determined that the second condition is not satisfied (NO in step S206), the base station device 1 and the terminal device 2 does not perform the series of processes associated with the RRM measurement.

Figure 21:
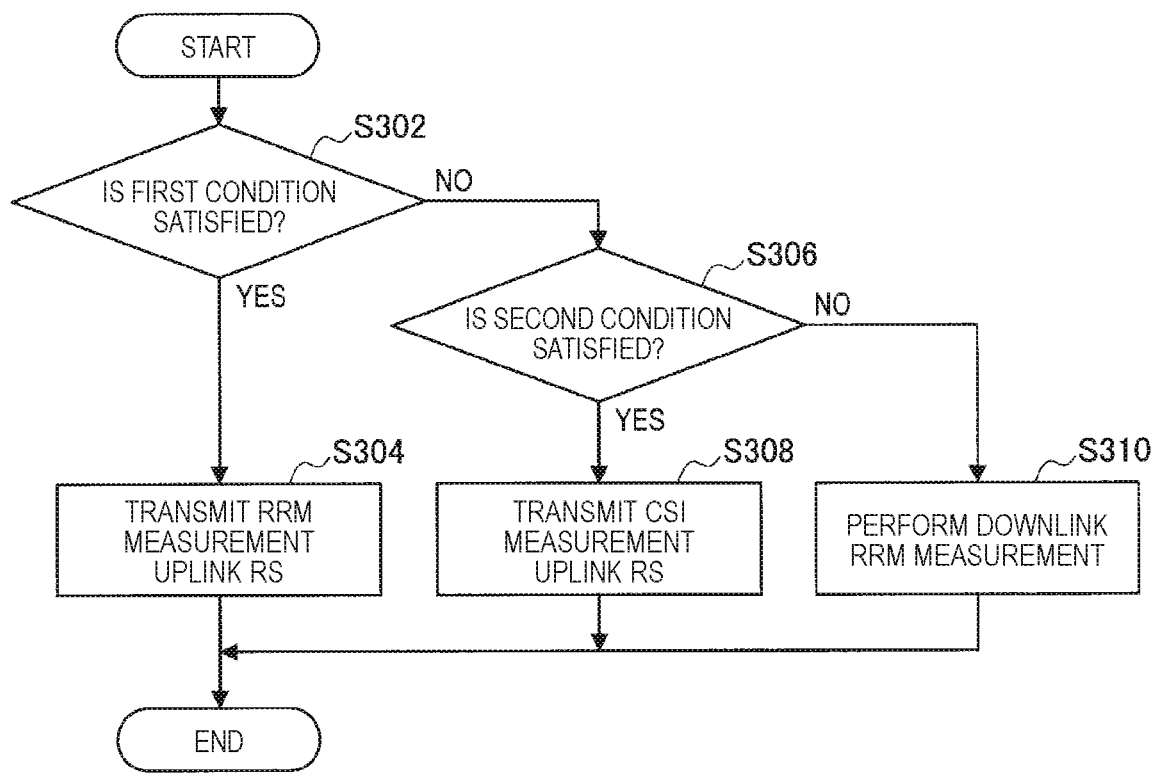
FIG. 21 is a diagram illustrating an example of a flow of a procedure for RRM measurement performed in a base station device and a terminal device of the present embodiment.

FIG. 21 is a diagram illustrating an example of a flow of a procedure for RRM measurement performed in the base station device 1 and the terminal device 2 of the present embodiment. The present procedure relates to switching among the transmission of the RRM measurement uplink RS, the transmission of the CSI measurement uplink RS, and the downlink RRM measurement. As illustrated in FIG. 21, the base station device 1 and the terminal device 2 determine whether or not the first condition is satisfied (step S302). In a case in which it is determined that the first condition is satisfied (YES in step S302), the transmission of the RRM measurement uplink RS is performed (step S304). That is, the terminal device 2 transmits the RRM measurement uplink RS and the base station device 1 performs the RRM measurement on the basis of the RRM measurement uplink RS. Conversely, in a case in which it is determined that the first condition is not satisfied (NO in step S302), the base station device 1 and the terminal device 2 determine whether or not the second condition is satisfied (step S306). In a case in which it is determined that the second condition is satisfied (YES in step S306), the transmission of the CSI measurement uplink RS is performed (step S308). That is, the terminal device 2 transmits the CSI measurement uplink RS and the base station device 1 performs the CSI measurement on the basis of the CSI measurement uplink RS. Conversely, in a case in which it is determined that the second condition is not satisfied (NO in step S306), the base station device 1 and the terminal device 2 perform the downlink RRM measurement (step S310). That is, the base station device 1 transmits the RRM measurement downlink RS and the terminal device 2 performs the RRM measurement on the basis of the RRM measurement downlink RS.

3. APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a Node B or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

3.1. Application Examples for Base Station

First Application Example

Figure 22:
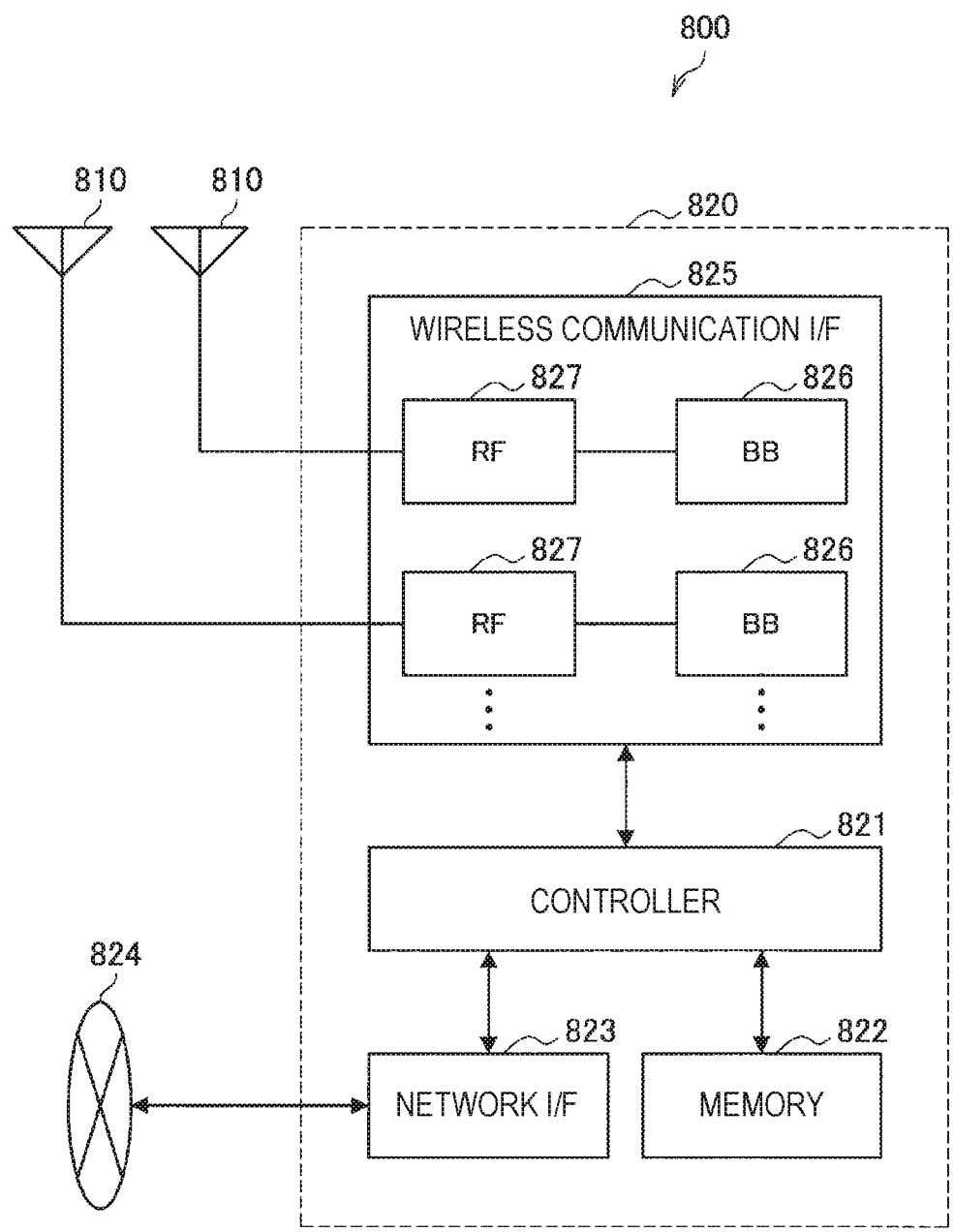
FIG. 22 is a block diagram illustrating a first example of a schematic configuration of an eNB.

FIG. 22 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 22, and the plurality of antennas 810 may, for example, correspond to a plurality of frequency bands used by the eNB 800. It should be noted that while FIG. 22 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 22, and the plurality of BB processors 826 may, for example, correspond to a plurality of frequency bands used by the eNB 800. Further, the wireless communication interface 825 may also include a plurality of the RF circuits 827, as illustrated in FIG. 22, and the plurality of RF circuits 827 may, for example, correspond to a plurality of antenna elements. Note that FIG. 22 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 22, the receiving unit 105 and/or the transmitting unit 107 described with reference to FIG. 8 may be mounted on the wireless communication interface 825 (for example, the BB processor 826 and/or the RF circuit 827). For example, the wireless communication interface 825 transmits the RRM measurement downlink RS, performs the RRM measurement on the basis of the RRM measurement uplink RS, performs the CSI measurement on the basis of the CSI measurement uplink RS, or performs switching thereof. For example, a function of performing this operation may be mounted on the processor included in the wireless communication interface 825. As a device performing this operation, the eNB 800, the base station device 820, or the foregoing module may be provided or a program causing the processor to perform the foregoing operation may be provided. In addition, a readable recording medium that records the foregoing program may be provided. In addition, the transceiving antenna 109 may be mounted on the antenna 810. In addition, the control unit 103 and the higher layer processing unit 101 may be mounted on the controller 821 and/or the network interface 823.

Second Application Example

Figure 23:
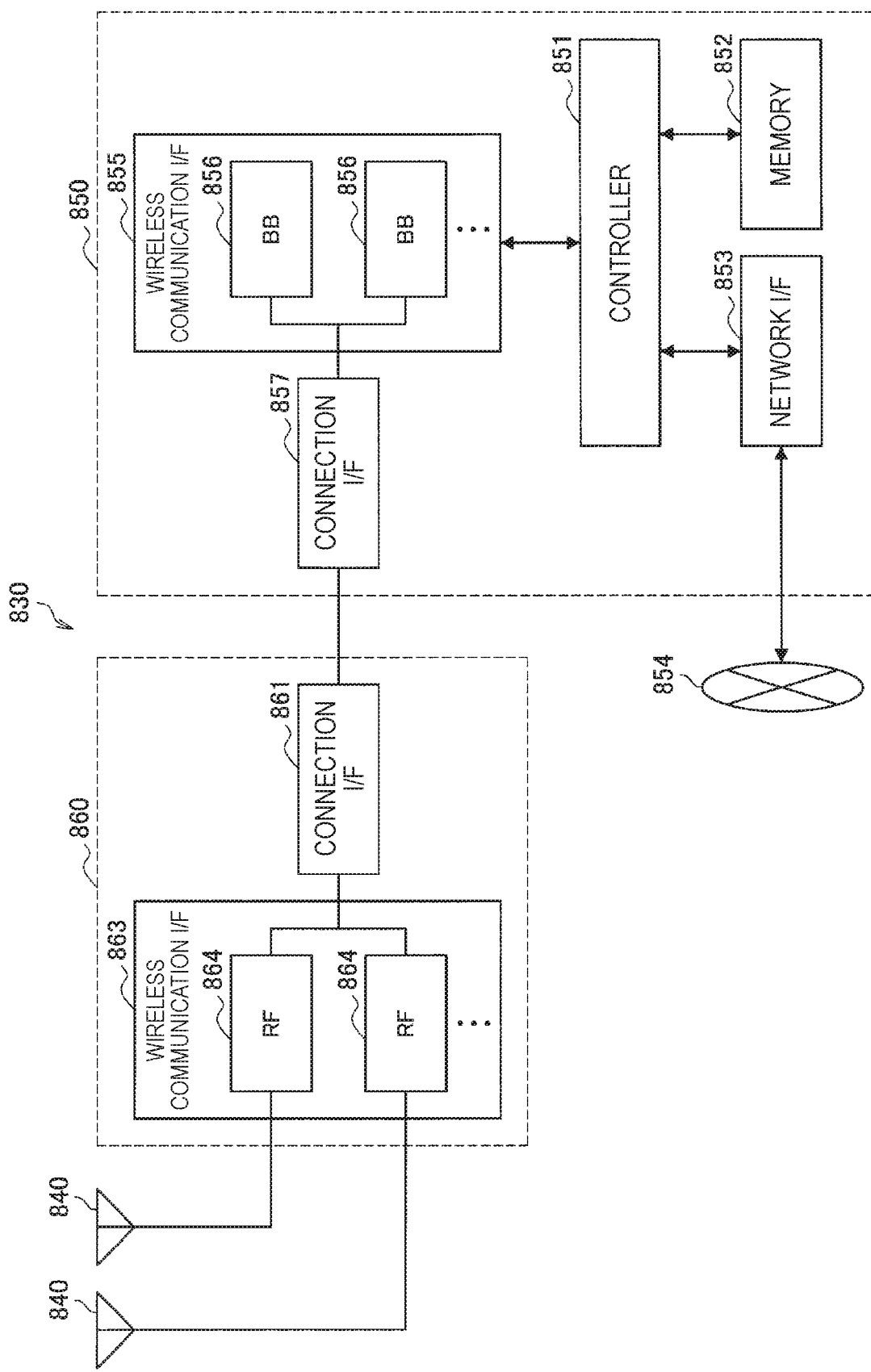
FIG. 23 is a block diagram illustrating a second example of the schematic configuration of the eNB.

FIG. 23 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 23, and the plurality of antennas 840 may, for example, correspond to a plurality of frequency bands used by the eNB 830. Note that FIG. 23 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 22 except that the BB processor 856 is connected to an RF circuit 864 of the RRH 860 via the connection interface 857. The wireless communication interface 855 may include a plurality of the BB processors 856, as illustrated in FIG. 23, and the plurality of BB processors 856 may, for example, correspond to a plurality of frequency bands used by the eNB 830. Note that FIG. 23 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 23, and the plurality of RF circuits 864 may, for example, correspond to a plurality of antenna elements. Note that FIG. 23 illustrates an example in which the wireless communication interface 863 includes the plurality of RF circuits 864, but the wireless communication interface 863 may include the single RF circuit 864.

In the eNB 830 illustrated in FIG. 23, the receiving unit 105 and/or the transmitting unit 107 described with reference to FIG. 8 may be mounted on the wireless communication interface 855 and/or the wireless communication interface 863 (for example, the BB processor 856 and/or the RF circuit 864). For example, the wireless communication interface 855 and/or the wireless communication interface 863 transmits the RRM measurement downlink RS, performs the RRM measurement on the basis of the RRM measurement uplink RS, performs the CSI measurement on the basis of the CSI measurement uplink RS, or performs switching thereof. For example, a function of performing this operation may be mounted on the processor included in the wireless communication interface 855 and/or the wireless communication interface 863. As a device performing this operation, the eNB 830, the base station device 850, or the foregoing module may be provided or a program causing the processor to perform the foregoing operation may be provided. In addition, a readable recording medium that records the foregoing program may be provided. In addition, the transceiving antenna 109 may be mounted on the antenna 840. In addition, the control unit 103 and the higher layer processing unit 101 may be mounted on the controller 851 and/or the network interface 853.

3.2. Application Examples for Terminal Device

First Application Example

Figure 24:
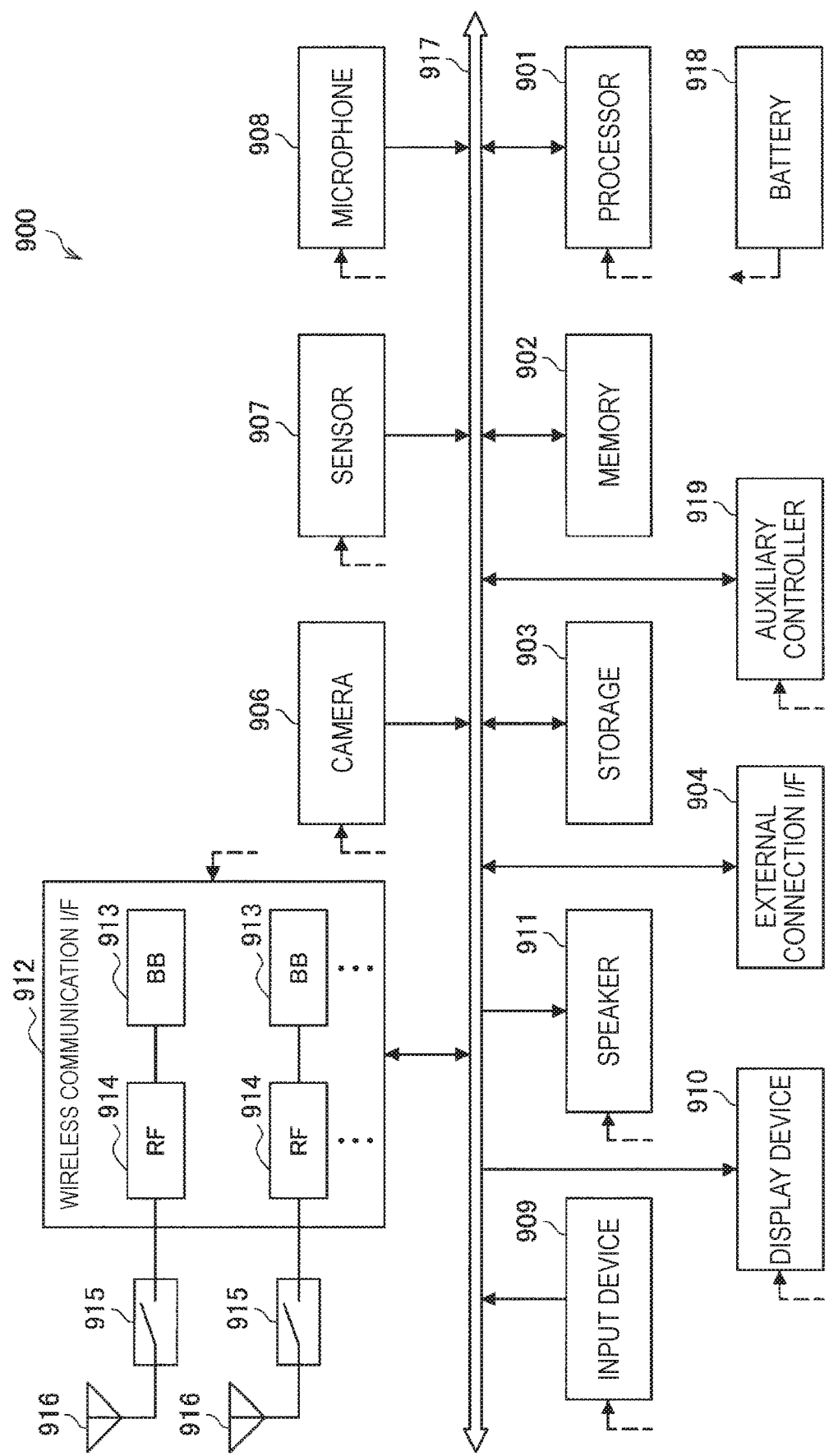
FIG. 24 is a block diagram illustrating an example of a schematic configuration of a smartphone.

FIG. 24 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 24. Note that FIG. 24 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 24. Note that FIG. 24 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 24 via a feeder line that is partially illustrated in the figure as a dashed line. The auxiliary controller 919, for example, operates a minimally necessary function of the smartphone 900 in a sleep mode.

In the smartphone 900 illustrated in FIG. 24, the receiving unit 205 and/or the transmitting unit 207 described with reference to FIG. 9 may be mounted on the wireless communication interface 912 (for example, the RF circuit 914 and/or the BB processor 913). For example, the wireless communication interface 912 transmits the RRM measurement uplink RS, transmits the CSI measurement uplink RS, performs the RRM measurement on the basis of the RRM measurement downlink RS, or performs switching thereof. For example, a function of performing this operation may be mounted on the processor included in the wireless communication interface 912. As a device performing this operation, the smartphone 900 or the foregoing module may be provided or a program causing the processor to perform the foregoing operation may be provided. In addition, a readable recording medium that records the foregoing program may be provided. In addition, the transceiving antenna 209 may be mounted on the antenna 916. In addition, the control unit 203 and the higher layer processing unit 201 may be mounted on the processor 901 and/or the auxiliary controller 919.

Second Application Example

FIG. 25 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 25. Note that FIG. 25 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 25. Note that FIG. 25 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 25 via a feeder line that is partially illustrated in the figure as a dashed line. Further, the battery 938 accumulates the electric power supplied from the vehicle.

In the car navigation apparatus 920 illustrated in FIG. 25, the receiving unit 205 and/or the transmitting unit 207 described with reference to FIG. 9 may be mounted on the wireless communication interface 933 (for example, the RF circuit 935 and/or the BB processor 934). For example, the wireless communication interface 933 transmits the RRM measurement uplink RS, transmits the CSI measurement uplink RS, performs the RRM measurement on the basis of the RRM measurement downlink RS, or performs switching thereof. For example, a function of performing this operation may be mounted on the processor included in the wireless communication interface 933. As a device performing this operation, the car navigation apparatus 920 or the foregoing module may be provided or a program causing the processor to perform the foregoing operation may be provided. In addition, a readable recording medium that records the foregoing program may be provided. In addition, the transceiving antenna 209 may be mounted on the antenna 937. In addition, the control unit 203 and the higher layer processing unit 201 may be mounted on the processor 921.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

4. CONCLUSION

The embodiment of the present disclosure has been described above with reference to FIGS. 1 to 25. As described above, the terminal device 2 according to the embodiment performs downlink measurement on the basis of the RRM measurement downlink RS and transmits the RRM uplink RS on the basis of the first setting related to the measurement for the radio resource management. In particular, in the case in which the first condition is satisfied, the terminal device 2 transmits the RRM measurement uplink RS. In the case in which the second condition is satisfied, the terminal device 2 performs the downlink measurement. On the other hand, the base station device 1 transmits the RRM measurement downlink RS. In the case in which the first condition is satisfied, the base station device 1 performs the uplink measurement on the basis of the RRM measurement uplink RS transmitted by the terminal device 2. Through the switching, the base station device 1 and the terminal device 2 can appropriately use the measurement of the RRM measurement downlink RS and the measurement of the RRM measurement uplink RS. Then, accordingly, it is possible to improve transmission efficiency of the entire system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Moreover, the process described using the flowchart in the present specification may not necessarily be performed in the order shown in the flowchart. Several processing steps may be performed in parallel. Moreover, additional processing steps may be adopted or some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A terminal device including:
a measuring unit configured to perform downlink measurement on the basis of a downlink reference signal; and
a transmitting unit configured to transmit a first uplink reference signal on the basis of first setting related to measurement for radio resource management,
in which the transmitting unit transmits the first uplink reference signal in a case in which a first condition is satisfied, and
the measuring unit performs the downlink measurement in a case in which a second condition is satisfied.

(2)
The terminal device according to (1),
in which, in the case in which the first condition is satisfied, the terminal device is in a connection mode, and
in the case in which the second condition is satisfied, the terminal device is an idle mode or an inactive mode.

(3)
The terminal device according to (1) or (2),
in which, in the case in which the first condition is satisfied, a target time resource is within a discontinuous reception (DRX) section, and
in the case in which the second condition is satisfied, the target time resource is outside of the DRX section.

(4)
The terminal device according to any one of (1) to (3), in which the transmitting unit transmits the first uplink reference signal in a case in which a third condition is satisfied and transmits a second uplink reference signal on the basis of second setting different from the first setting in a case in which a fourth condition is satisfied.

(5)
The terminal device according to (4),
in which, in the case in which the third condition is satisfied, a target frequency resource is deactivated, and
in the case in which the fourth condition is satisfied, the target frequency resource is activated.

(6)
The terminal device according to (4) or (5),
in which, in the case in which the third condition is satisfied, a target time resource is a transmission timing instructed in the first setting, and
in the case in which the fourth condition is satisfied, the target time resource is a transmission timing instructed in the second setting and is not the transmission timing instructed in the first setting.

(7)
The terminal device according to any one of (4) to (6), in which, with a predetermined frequency resource, the first uplink reference signal and the second uplink reference signal are not simultaneously transmitted.

(8)
A base station device including:
a transmitting unit configured to transmit a downlink reference signal; and
a measuring unit configured to perform first uplink measurement on the basis of a first uplink reference signal transmitted by a terminal device that transmits the first uplink reference signal on the basis of first setting related to measurement for radio resource management in a case in which a first condition is satisfied, and performs downlink measurement on the basis of the downlink reference signal in a case in which a second condition is satisfied.

(9)
The base station device according to (8), further including:
a transfer unit configured to transfer measurement information obtained through the first uplink measurement to an adjacent base station.

(10)
The base station device according to (8) or (9),
in which, in a case in which a first condition is satisfied, the terminal device is in a connection mode, and
in the case in which the second condition is satisfied, the terminal device is in an idle mode or an inactive mode.

(11)
The base station device according to any one of (8) to (10),
in which, in the case in which the first condition is satisfied, a target time resource is within a DRX section, and
in the case in which the second condition is satisfied, the target time resource is outside of the DRX section.

(12)
The base station device according to any one of (8) to (11), in which the measuring unit performs the first uplink measurement in a case in which a third condition is satisfied, and performs second uplink measurement on the basis of a second uplink reference signal transmitted by the terminal device on the basis of second setting different from the first setting in a case in which a fourth condition is satisfied.

(13)
The base station device according to (12),
in which, in the case in which the third condition is satisfied, a target frequency resource is deactivated, and
in the case in which the fourth condition is satisfied, the target frequency resource is activated.

(14)
The base station device according to (12) or (13),
in which, in the case in which the third condition is satisfied, a target time resource is a transmission timing instructed in the first setting, and
in the case in which the fourth condition is satisfied, the target time resource is a transmission timing instructed in the second setting and is not the transmission timing instructed in the first setting.

(15)

The base station device according to any one of (12) to (14),
in which, with a predetermined frequency resource, the first uplink reference signal and the second uplink reference signal are not simultaneously transmitted.

(16)

A method performed by a processor, the method including:
performing downlink measurement on the basis of a downlink reference signal in a case in which a second condition is satisfied; and
transmitting a first uplink reference signal on the basis of first setting related to measurement for radio resource management in a case in which a first condition is satisfied.

(17)

A method performed by a processor, the method including:
transmitting a downlink reference signal; and
performing first uplink measurement on the basis of a first uplink reference signal transmitted by a terminal device that transmits the first uplink reference signal on the basis of first setting related to measurement for radio resource management in a case in which a first condition is satisfied, and performs downlink measurement on the basis of the downlink reference signal in a case in which a second condition is satisfied.

REFERENCE SIGNS LIST 1 base station device
101 higher layer processing unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:

1. A terminal device, comprising:
circuitry configured to:
determine one of a first condition is satisfied or a second condition is satisfied, wherein
the first condition indicates that the terminal device is in a first mobility state,
the first mobility state corresponds to a state in which a number of cell reselections by the terminal device exceeds a first threshold,
the second condition indicates that the terminal device is in a second mobility state, and
the second mobility state corresponds to a state in which the number of cell reselections by the terminal device exceeds a second threshold and is less than the first threshold;
execute downlink measurement based on a downlink reference signal and the determination that the second condition, indicating that the terminal device is in the second mobility state, is satisfied;
determine a third condition is satisfied, wherein the third condition indicates a target frequency resource is deactivated;
transmit a first uplink reference signal based on
the deactivation of the target frequency resource,
a first setting related to measurement for radio resource management, and
the determination that the first condition, indicating that the terminal device is in the first mobility state, is satisfied;
determine a fourth condition is satisfied, wherein the fourth condition indicates the target frequency resource is activated; and
transmit a second uplink reference signal based on
a second setting different from the first setting, and
the activation of the target frequency resource.

2. The terminal device according to claim 1, wherein
the first condition further indicates the terminal device is in a connection mode, and
the second condition further indicates the terminal device is in one of an idle mode or an inactive mode.

3. The terminal device according to claim 1, wherein
the third condition further indicates a target time resource is a transmission timing in the first setting,
the fourth condition further indicates the target time resource is a transmission timing in the second setting, and
the transmission timing in the second setting is different from the transmission timing in the first setting.

4. The terminal device according to claim 1, wherein the circuitry is further configured to transmit, with a specific frequency resource, one of the first uplink reference signal or the second uplink reference signal.

5. A base station device, comprising:
circuitry configured to:
transmit a downlink reference signal;
receive a first uplink reference signal from a terminal device, wherein the terminal device:
determines one of a first condition is satisfied or a second condition is satisfied, wherein
the first condition indicates that the terminal device is in a first mobility state,
the first mobility state corresponds to a state in which a number of cell reselections by the terminal device exceeds a first threshold,
the second condition indicates that the terminal device is in a second mobility state, and the second mobility state corresponds to a state in which the number of cell reselections by the terminal device exceeds a second threshold and is less than the first threshold, transmits the first uplink reference signal to the base station device based on the determination that the first condition, indicating that the terminal device is in the first mobility state, is satisfied and a first setting related to measurement for radio resource management, transmits a second uplink reference signal to the base station device based on a second setting different from the first setting, and executes downlink measurement based on the downlink reference signal and the determination that the second condition, indicating that the terminal device is in the second mobility state, is satisfied;

determine a third condition is satisfied, wherein the third condition indicates a target frequency resource is deactivated;

execute first uplink measurement based on
the deactivation of the target frequency resource, and
the first uplink reference signal received from the terminal device;

determine a fourth condition is satisfied, wherein the fourth condition indicates the target frequency resource is activated;

receive the second uplink reference signal based on the second setting; and execute second uplink measurement based on the second uplink reference signal and the activation of the target frequency resource.

6. The base station device according to claim 5, wherein the circuitry is further configured to:

obtain measurement information based on the first uplink measurement; and transfer the obtained measurement information to an adjacent base station device.

7. The base station device according to claim 5, wherein the first condition further indicates the terminal device is in a connection mode, and the second condition further indicates the terminal device is in one of an idle mode or an inactive mode.

8. The base station device according to claim 5, wherein the third condition further indicates a target time resource is a transmission timing in the first setting, the fourth condition further indicates the target time resource is a transmission timing in the second setting, and the transmission timing in the second setting is different from the transmission timing in the first setting.

9. The base station device according to claim 5, wherein the terminal device further transmits, with a specific frequency resource, one of the first uplink reference signal or the second uplink reference signal.

10. A method executed by a processor, the method comprising:

determining one of a first condition is satisfied or a second condition is satisfied, wherein the first condition indicates that a terminal device is in a first mobility state, the first mobility state corresponds to a state in which a number of cell reselections by the terminal device exceeds a first threshold, and the second condition indicates that the terminal device is in a second mobility state, and the second mobility state corresponds to a state in which the number of cell reselections by the terminal device exceeds a second threshold and is less than the first threshold;

executing downlink measurement based on a downlink reference signal and the determination that the second condition, indicating that the terminal device is in the second mobility state, is satisfied;

determining a third condition is satisfied, wherein the third condition indicates a target frequency resource is deactivated;

transmitting a first uplink reference signal based on
the deactivation of the target frequency resource,
a first setting related to measurement for radio resource management, and
the determination that the first condition, indicating that the terminal device is in the first mobility state, is satisfied;

determining a fourth condition is satisfied, wherein the fourth condition indicates the target frequency resource is activated; and transmitting a second uplink reference signal based on
a second setting different from the first setting, and
the activation of the target frequency resource.

11. A method executed by a processor, the method comprising:

transmitting a downlink reference signal to a terminal device for downlink measurement;

receiving a first uplink reference signal from the terminal device based on a satisfaction of a first condition indicating that the terminal device is in a first mobility state that corresponds to a state in which a number of cell reselections by the terminal device exceeds a first threshold, wherein the terminal device:

transmits the first uplink reference signal based on the satisfaction of the first condition and a first setting related to measurement for radio resource management, transmits a second uplink reference signal based on a second setting different from the first setting, and executes the downlink measurement based on the downlink reference signal and a satisfaction of a second condition, wherein the second condition indicates that the terminal device is in a second mobility state that corresponds to a state in which the number of cell reselections by the terminal device exceeds a second threshold and is less than the first threshold;

determining a third condition is satisfied, wherein the third condition indicates a target frequency resource is deactivated;

executing first uplink measurement based on
the deactivation of the target frequency resource, and
the first uplink reference signal received from the terminal device;

determining a fourth condition is satisfied, wherein the fourth condition indicates the target frequency resource is activated;

receiving the second uplink reference signal based on the second setting; and executing second uplink measurement based on the second uplink reference signal and the activation of the target frequency resource.

* * * * *